US012675313B2

(12) United States Patent
Kobayashi

(10) Patent No.: US 12,675,313 B2
(45) Date of Patent: Jul. 7, 2026

(54) PROCESSING DEVICE, PROCESSING METHOD, AND PROCESSING PROGRAM

(71) Applicant: ACSIOMA LTD., Fukuoka (JP)

(72) Inventor: Taizo Kobayashi, Fukuoka (JP)

(73) Assignee: ACSIOMA LTD., Fukuoka City (JP)

( * ) Notice: Subject to any disclaimer, the term of this patent is extended or adjusted under 35 U.S.C. 154(b) by 953 days.

(21) Appl. No.: 17/791,131

(22) PCT Filed: Jan. 7, 2021

(86) PCT No.: PCT/JP2021/000372
§ 371 (c)(1),
(2) Date: Jan. 13, 2023

(87) PCT Pub. No.: WO2021/141086
PCT Pub. Date: Jul. 14, 2021

(65) Prior Publication Data
US 2023/0144969 A1 May 11, 2023

(30) Foreign Application Priority Data

Jan. 9, 2020 (JP) ................................. 2020-002411

(51) Int. Cl.
*G06F 9/48* (2006.01)
(52) U.S. Cl.
CPC .................................... *G06F 9/485* (2013.01)
(58) Field of Classification Search
CPC .................................... G06F 9/485; G06F 9/44
See application file for complete search history.

(56) References Cited

U.S. PATENT DOCUMENTS

| | | | | |
|---|---|---|---|---|
| 10,489,212 B2 * | 11/2019 | Smith | ..................... | G06F 30/20 |
| 2004/0015673 A1 * | 1/2004 | Welfeld | ................... | G06F 9/44 |
| | | | | 711/200 |

(Continued)

FOREIGN PATENT DOCUMENTS

| | | |
|---|---|---|
| CN | 1664777 A | 9/2005 |
| JP | H7-174389 A | 7/1995 |

(Continued)

OTHER PUBLICATIONS

Patent Cooperation Treaty, International Search Report, Application No. PCT/JP2021/000372, dated Feb. 25, 2021, in 2 pages.

(Continued)

*Primary Examiner* — Peng Ke
(74) *Attorney, Agent, or Firm* — PROCOPIO, CORY, HARGREAVES & SAVITCH LLP

(57) ABSTRACT

A processing apparatus 1 includes a determiner 30 that compares state information, which is information pertaining to states obtained from a field, and performs processing related to a determiner 30 based on information specifying a content of a comparison in the determiner and an operation pertaining to a state transition according to the result of the comparison, and on information pertaining to generation of a state information generator for generating the state information from the information pertaining to the state of the field. The information specifying the contents of the comparison in the determiner 30 and the operation pertaining to the state transition according to the result of the comparison, and the information pertaining to the generation of the state information generator for generating the state information from the information pertaining to the state of the field can be changed regardless of the operation of the determiner 30.

18 Claims, 16 Drawing Sheets

(56) References Cited

U.S. PATENT DOCUMENTS

| 2011/0246124 A1 | 10/2011 | Lill et al. |
| 2018/0239636 A1* | 8/2018 | Arora ...................... G06F 9/485 |
| 2019/0297081 A1 | 9/2019 | Dubman et al. |
| 2019/0394148 A1* | 12/2019 | Duan .................... H04L 51/063 |
| 2020/0134246 A1* | 4/2020 | Sun ......................... G06F 17/15 |

FOREIGN PATENT DOCUMENTS

| JP | 2003-303099 A | 10/2003 |
| JP | 2004-199327 A | 7/2004 |
| JP | 2011-130235 A | 6/2011 |
| JP | 2012-227818 A | 11/2012 |
| JP | 2016-119033 A | 6/2016 |
| WO | 2016/161266 A1 | 10/2016 |
| WO | 2017/033389 A1 | 3/2017 |

OTHER PUBLICATIONS

Patent Cooperation Treaty, International Preliminary Report on Patentability, Application No. PCT/JP2021/000372, dated Feb. 25, 2021, in 6 pages.

Akai, Kazuyuki et al., "The Prototype and Evaluation of the Device Control System for Energy Saving which Learns the Configuration and User's Preference", IEICE Technical Report, Dec. 16, 2011, vol. 111, No. 344, p. 31-p. 36.

Hatena Blog, "Overview of the CRAP Model", dated Aug. 13, 2019, in 7 pages.

Chen Xiao-qin, Jiang Cun-bo, Jin Hong, The application of the finite automation principle in control program, Oct. 29, 2007, in 16 pages.

\* cited by examiner

*Fig.4*

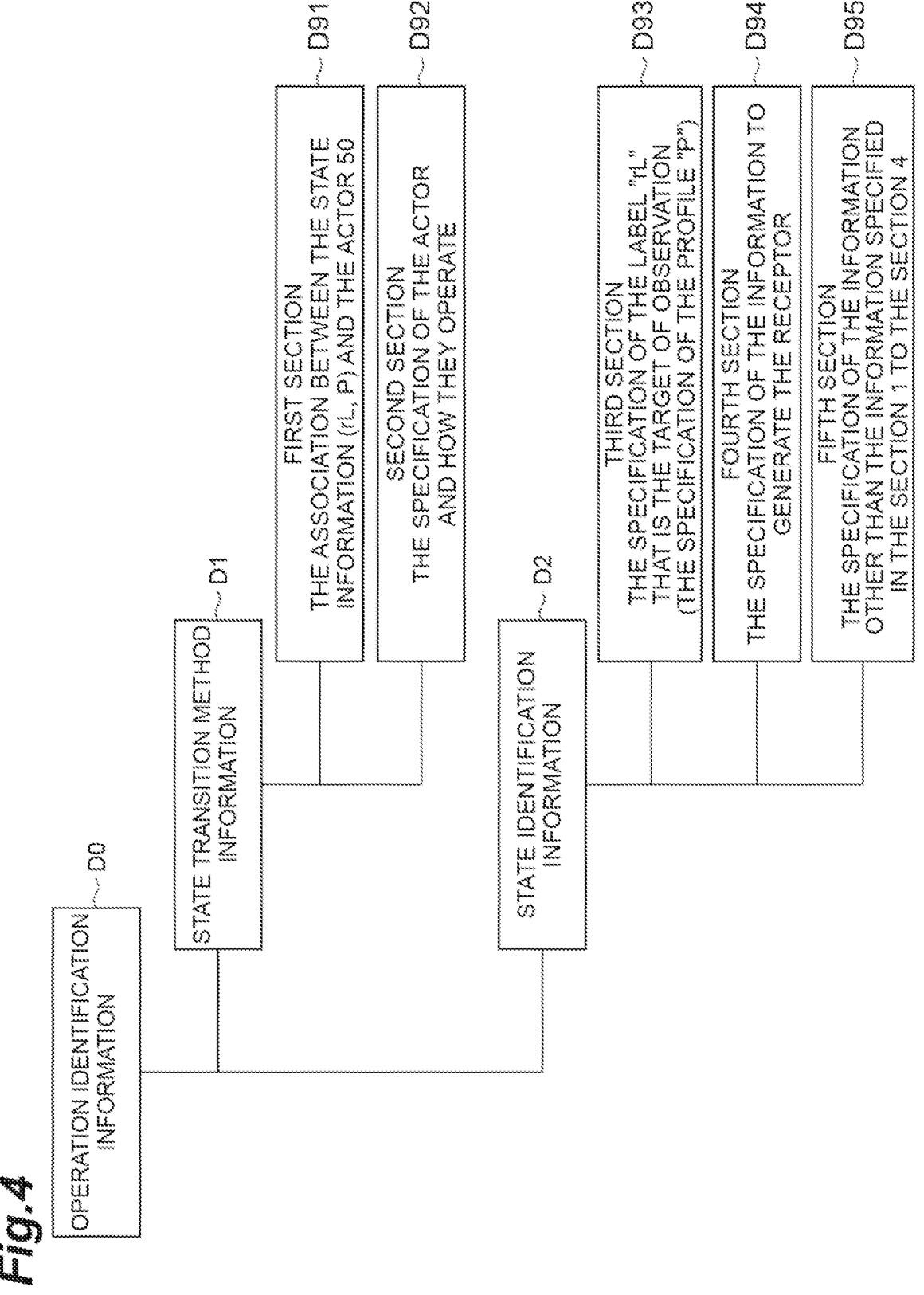

OPERATION IDENTIFICATION INFORMATION — D0

STATE TRANSITION METHOD INFORMATION — D1

FIRST SECTION
THE ASSOCIATION BETWEEN THE STATE INFORMATION (rL, P) AND THE ACTOR 50 — D91

SECOND SECTION
THE SPECIFICATION OF THE ACTOR AND HOW THEY OPERATE — D92

STATE IDENTIFICATION INFORMATION — D2

THIRD SECTION
THE SPECIFICATION OF THE LABEL "rL" THAT IS THE TARGET OF OBSERVATION (THE SPECIFICATION OF THE PROFILE "P") — D93

FOURTH SECTION
THE SPECIFICATION OF THE INFORMATION TO GENERATE THE RECEPTOR — D94

FIFTH SECTION
THE SPECIFICATION OF THE INFORMATION OTHER THAN THE INFORMATION SPECIFIED IN THE SECTION 1 TO THE SECTION 4 — D95

PROCESSING DEVICE, PROCESSING METHOD, AND PROCESSING PROGRAM

CROSS-REFERENCE TO RELATED APPLICATIONS

This application is US National Stage of International Patent Application PCT/JP2021/000372, filed Jan. 7, 2021, which claims benefit of priority from Japanese Patent Application JP2020-002411, filed Jan. 9, 2020, the contents of both of which are incorporated herein by reference.

TECHNICAL FIELD

This invention relates to a processing apparatus, a processing method, and a processing program.

BACKGROUND ART

Processing apparatus that perform predetermined processing based on a program have been known in the past. For example, Patent Document 1 discloses a program for displaying input formulas on a display and verifying the input formulas.

CITATION LIST

Patent Literature

[Patent Document 1] Japanese Unexamined Patent Publication No. 2016-119033

SUMMARY OF INVENTION

Technical Problem

In devices applying conventional programs, there was room for improvement in terms of convenience, reliability, or safety, for example, when changing, adding, or deleting conditions or functions, it was necessary to virtually stop the program operation once.

The purpose of this disclosure is to provide a processing apparatus, a processing method, and a processing program with enhanced convenience, reliability, or safety.

Solution to Problem

In order to achieve the above-mentioned purpose, a processing apparatus pertaining to an aspect of the present disclosure includes a determiner that compares state information, which is information pertaining to states obtained from a field, and performs processing related to determiner based on information specifying the contents of comparison in the determiner and operations pertaining to state transitions according to the results of the comparison, and on information pertaining to generation of a state information generator to generate state information from information pertaining to a state of the field. The information specifying the contents of the comparison in the determiner and the operations pertaining to the state transition according to the result of the comparison, and the information pertaining to the generation of the state information generator to generate the state information from the information pertaining to the state of the field, can be changed regardless of the operation of the determiner.

A processing method pertaining to another aspect of the present disclosure performs: comparing, with a determiner, state information, which is information pertaining to a state obtained from a field; and performing processing related to the determiner based on information specifying the contents of the comparison in the determiner and actions pertaining to state transitions according to the results of the comparison, and information pertaining to generation of a state information generator to generate state information from information pertaining to a state of the field. The information specifying the contents of the comparison in the determiner and operations pertaining to the state transition according to the result of the comparison, and the information pertaining to the generation of the state information generator to generate state information from the information pertaining to the state of the field, can be changed regardless of the operation of the determiner.

A processing program pertaining to another aspect of the present disclosure is a processing program for causing a computer to function as a processing apparatus, and to realize a judgment function for comparing state information, which is information pertaining to states obtained from a field, and to perform processing related to the determining function based on information specifying the contents of the comparison in the judgment function and actions pertaining to state transitions according to the results of the comparison, and information pertaining to generation of a state information generator to generate state information from information pertaining to a state of the field. The information specifying the contents of the comparison in the judgment function and actions pertaining to the state transition according to the result of the comparison, and the information pertaining to the generation of the state information generator to generate state information from the information pertaining to the state of the field, can be changed regardless of the operation of the determining function.

A processing apparatus pertaining to another aspect of this disclosure includes a determiner that makes comparisons about state information, which is information pertaining to a state obtained from a field, and the state information includes a label pertaining to the property of the state and a profile indicating what state the property identified by the label is in.

A processing apparatus pertaining to another aspect of the present disclosure includes a determiner that compares state information, which is information pertaining to states obtained from a field, and performs processing related to the determiner based on information specifying the contents of the comparison in the determiner and actions pertaining to state transitions according to the results of the comparison, and information pertaining to generation of state information from information pertaining to states in the field. The information specifying the contents of the comparison in the determiner and the actions pertaining to the state transition according to the result of the comparison, and the information pertaining to the generation of the state information generation part for generating state information from the information pertaining to the state of the field can be changed independently of the operation of the determiner, and the state information includes a label pertaining to the property of the state and a profile indicating what state the property identified by the label is in.

Advantageous Effects of Invention

According to the present disclosure, processing apparatus, processing methods, and processing programs with enhanced convenience, reliability, or safety are provided.

BRIEF DESCRIPTION OF DRAWINGS

FIG. 4 illustrates an example of operation identification information handled by the processing apparatus.

DESCRIPTION OF EMBODIMENTS

The following is a detailed description of the embodiments for implementing the present disclosure with reference to the accompanying drawings. In the description of the drawings, identical elements are marked with identical symbols, and redundant explanations are omitted.

In this embodiment, after providing a general framework as an overview of the Processing apparatus and method, this section describes the details of the Processing apparatus and method, explaining the specific steps involved in actually applying the Processing apparatus to a desired process.
<Summary of Processing Apparatus>
[Schematic Diagram of the Processing Apparatus]

Figure 1:
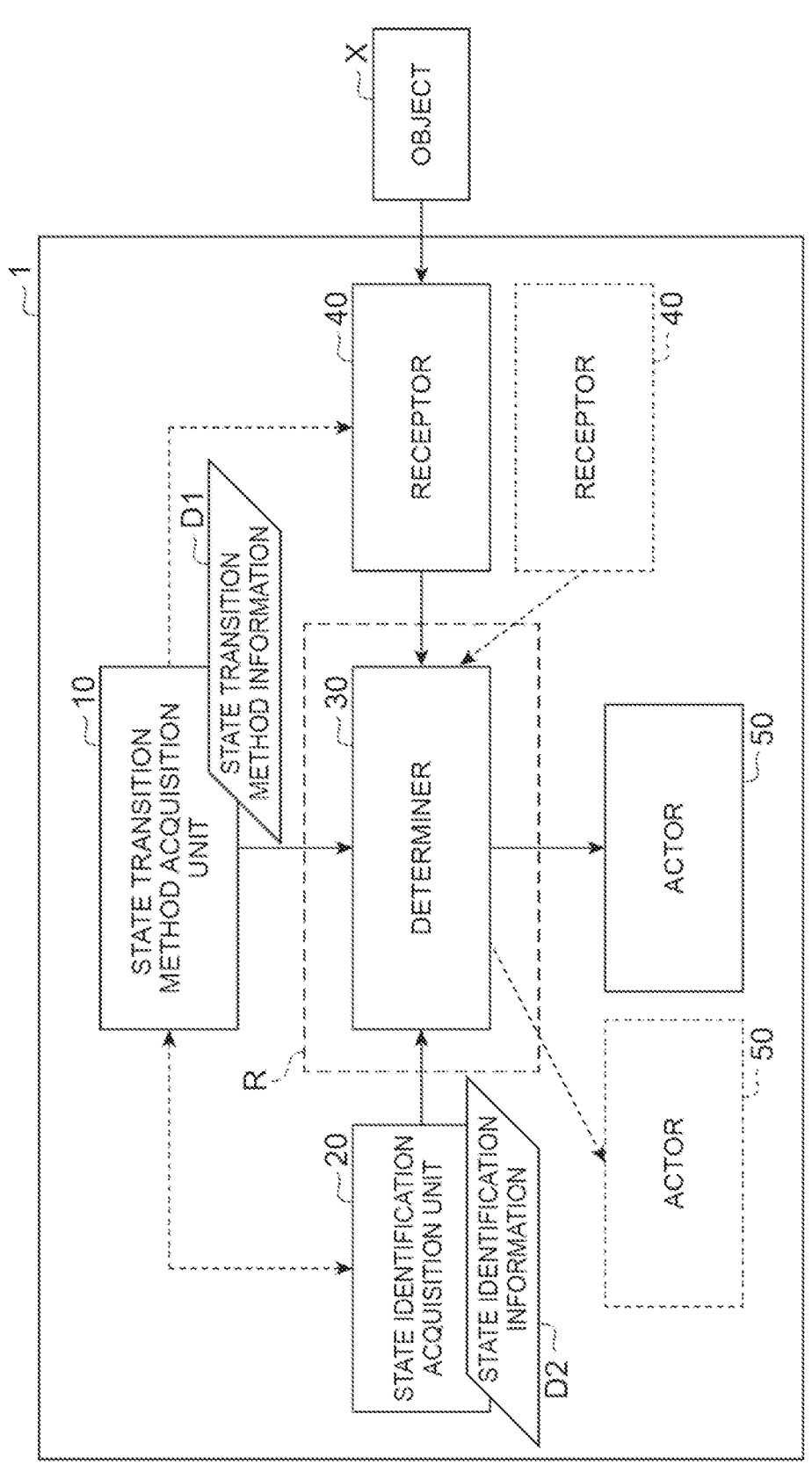
FIG. 1 shows an example of a functional block illustrating the functions of a processing apparatus according to an embodiment.

FIG. 1 illustrates a functional description of a processing apparatus in one embodiment. The processing apparatus 1 described in this embodiment includes a state transition method acquisition unit 10, a state identification acquisition unit 20, and a determiner 30. In addition, in FIG. 1, functional units that cooperate with the determiner 30, such as a receptor 40 and an actor 50 are shown. The receptor 40 can be used, for example, as a state information generator. The receptor 40 and the actor 50 can add, change, or delete functions, for example, by being specified by the state transition method acquisition unit 10 and/or the state identification acquisition unit 20.

The processing apparatus 1 described in this embodiment can be a device that transitions the state of a field. The processing apparatus 1 may also be a device that changes the state of the field. In this embodiment, the field can be all of the states of the field as a reality in the real world, and it can be all of perceivable objects. The Perceivable objects can be, for example, a region (e.g., place, space, time, etc.) whose state can be detected by a receptor described below. For example, the state of the field can be detected by the receptor. For example, the field can refer to an area that can be influenced by the actor 50. The area that can be influenced by the actor 50 can be the actor 50 itself. For example, the field can refer to a region other than the determiner 30 belonging to a certain processing apparatus 1 from a standpoint of that processing apparatus 1. For example, from the standpoint of a processing apparatus 1, any processing apparatus 1 other than that processing apparatus 1 can be the field. The processing apparatus 1 can be a device that compares the state detected in the receptor 40 with the state specified in state transition method information D1 handled by the state transition method acquisition unit 10, and based on the result of the comparison, performs an action pertaining to a state transition by the actor 40.

The processing apparatus 1 can be a device that performs multi-step processing. Performing the multi-step processing can be defined, for example, as executing processing pertaining to the judgment or comparison by the determiner 30 in at least one of the multiple steps. By having such a configuration, the processing apparatus 1 may be realized, for example, as a control device for controlling a device or system to be controlled. The operation of the processing apparatus 1 described below may be performed in at least one of a plurality of steps.

The state transition method acquisition unit 10 can hold and handle state transition method information D1. The state transition method information D1 held by the state transition method acquisition unit 10 can be a set of rules for the operation of the processing apparatus 1. In the processing apparatus 1, the state of the field can be described by "state information" that includes at least a combination of a label (rL) and a profile (P). The label (rL) can correspond to a name of a "property" for describing the state in the state information. For example, labels can include "temperature", "humidity", etc. The profile (P) can be information that indicates the state of the "property" identified by the label. When the label (rL) is "humidity," the actual numerical value of humidity (such as "50%") combined with unit information and numerical information, or when the label (rL) is "humidity (%)" with unit information, the actual humidity value minus the unit information (e.g., "50") can correspond to the profile (P). In the following embodiment, the combination of the label (rL) and the profile (P) may be described as (rL, P). For example, a state in which the label is humidity and the profile is 50% may be described as (it: humidity, P: 50%) or (rL: humidity (%), P: 50).

The state transition method information D1 held by the state transition method acquisition unit 10 can specify the contents of the comparison of states by the processing apparatus 1 and operations related to state transitions according to the results of the comparison, such as having the actor perform operations to transition the state of the field when the state of the field is in a predetermined state (e.g., the label and profile included in the state information are in predetermined conditions). For example, a description such as "When the label and profile are in the predetermined conditions, the actor is made to perform the specified operation to transition or change the state of the field" as described above can correspond to a rule pertaining to the operation of the processing apparatus 1. The state transition method information D1 can include two sections, the details of which are described below.

The state identification acquisition unit 20 holds the state identification information D2 and can have the function of making settings pertaining to the operation of the processing apparatus 1. As described above, in the processing apparatus 1, the state of the field can be described by a combination of the label (rL) and the profile (P). The state identification acquisition unit 20 can retain state identification information D2. The state identification information D2 can be in the form of specifying the label (rL) to be observed by the processing apparatus 1 and the conditions for operating the receptor. The state identification information D2 can be, but is not limited to, the above-stated form.

The state identification information D2 handled in the state identification acquisition unit 20 can specify the label (rL) to be used and the predetermined state of the state transition corresponding to the label. The predetermined state can be, for example, the final state to be transitioned to, a previous state of the final state, multiple previous states leading to the predetermined state, or a combination of the final state and previous states. Or, the final state can be the information that determines whether or not the actor performs the action. Or, it can be information that serves as a criterion for determining whether or not to perform the actor's operation when the predetermined state is the final state. However, the method of specifying the state using State identification information D2 is not limited to this method. For example, an example of a condition specified in State identification information D2 can be "the profile (P) corresponding to a certain label (rL) is within a predetermined range". The state identification information D2 can include three sections, the details of which are described below.

The determiner 30 can be a device that makes a decision to execute the actor's operation according to the state of the field. The determiner 30 can obtain label (rL) and profile (P) identifying the state of the field specified by the state transition information D1 held in the state transition method acquisition unit 10 and the state identification information D2 held in the state identification acquisition unit 20 described above. The determiner 30 may have the function of obtaining the field state (rL, P) from the receptor provided to obtain the field state (rL, P). In addition, the determiner 30 may also have a function to compare the obtained field state (rL, P) with the condition specified by the state transition method information D1 in the State transition method acquisition unit 10 to cause the actor to start up, operate, etc.

The state transition method acquisition unit 10 and the state identification acquisition unit 20 described above may also have a function to retain information pertaining to the setting of conditions for executing judgments in the determiner 30. In addition, if either or both of the state transition method information D1 held by the state transition method acquisition unit 10 and the state identification information D2 held by the state identification acquisition unit 10, are changed, the operation of the determiner 30 may be changed. When the state transition method information D1 or the state identification information D2 are changed, the state transition method acquisition unit 10 and the state identification acquisition unit 20 may have a function to detect these changes and promptly change the processing in the determiner 30.

Next, the receptor 40 and the actor 50 associated with the determiner 30 are described.

The receptor 40 may have a function to obtain the field state (rL, P) to be provided to the determiner 30. A label (rL) may be used, for example, as an identifying name for the receptor 40. It may be for example a profile (P) as the information received by the receptor 40.

The receptor 40 can be linked to a target X, etc., such as an external sensor to acquire the field state (rL, P), and the receptor 40 can provide information acquired from the target X, etc. to the determiner 30 as the field state (rL, P). The receptor 40 can be configured to acquire information from the target X at any time, or it can be configured to detect changes in the target X. It is a function that can be required of the receptor 40 to properly detect changes in the target X when the target X changes.

The receptor 40 can be added, deleted, or functionally modified depending on the "field state (rL, P)" to be handled by the determiner 30. In FIG. 1, two receptors 40 (a solid receptor 40 and a dashed receptor 40) are illustrated. Thus, the determiner 30 can obtain the field state (rL, P) from multiple receptors 40. The receptor 40 can be controlled (generated, changed, or deleted), for example, by a receptor's platform 33 in the determiner 30 described below, based on the state transition method information D1 held in state transition method acquisition unit 10 and the state identification information D2 held in the state transition method acquisition unit 20. When the receptor 40 acquires information pertaining to the change from the target X (when the target X is a sensor, a measured value of a sensor, etc.), the receptor 40 can provide the "field state (rL, P)" combined an appropriate label (rL) corresponding to the acquired information to the determiner 30. As described above, the receptor 40 can convert the information acquired from the target X into state information (rL, P) and then provide it to the determiner 30. The receptor 40 may have a function as a state information generator that generates state information based on the state of the field. It goes without saying that only one receptor 40 may be used.

In addition, the combination (rL, P) of information identifying the state of the field (the state information) may be state information identifying the state of the field, when the information acquired from the target X, etc. reaches the receptor 40, then the label (rL) and the profile (P) become a pair of states (rL, P). For example, the information before reaching the receptor 40 may be a combination of (rL, P), in the receptor 40, information combining the label (rL) and profile (P) as the state information may be generated at the receptor 40. Since there is no restriction on the content of the profile (P), for example, the profile (P) may include information analogous to the label and information analogous to the profile (rL', P'). In this case, in the receptor 40, the state information (rL, P)=(rL, (rL', P')) that will also be able to assign an appropriate label (rL) based on the description in the state transition method information D1 and the state identification information D2 is formed. Thus, for example, information analogous to the label (rL) may be assigned at a stage prior to receptor 40 (e.g., the target X), but the receptor 40 acquires information from target X, etc. at least as a profile (P) and assigns a label (rL) to it based on the state transition method information D1 and the state identification information D2, then it can be provided to the determiner 30 as State Information.

The receptor 40 can be specified by the state transition method information D1 and the state identification information D2. The types (e.g., functions) of the receptor 40 include, for example, the following. The type of the receptor used can be determined by the type of the target X. The types of the receptors are not limited to the examples below and can be extended depending on the type of the target X.

File Receptor: A function that detects changes in values included in a particular file (including changes in content, timestamps, etc.). The file may be a direct memory manipulation, for example, RAMFS.

FIFO Receptor: A function to detect an insertion of a value into a device (e.g., memory) with FIFO (First In First Out) characteristics.

Network Receptor: A function to monitor specific ports and detect incoming packets.

Device Receptor: A function to detect changes in the characteristics of a specific device (e.g., a sensor).

DB Receptor: A function to detect changes in specific records in a specific database.

The number of the receptor 40 may be increased or decreased depending on the number of the target X. For example, when detecting changes in multiple targets X of the same type, a receptor 40 may be provided for each of the multiple targets X. In the case of multiple targets X, how the receptor 40 is provided may be changed according to the provisions of the state transition method acquisition unit 10 and the state identification acquisition unit 20.

As mentioned above, the state transition method acquisition unit 10 and the state identification acquisition unit 20 may also have a function to detect changes in the state transition method information D1 and the state identification information D2 that exist in the field. Therefore, the state transition method acquisition unit 10 and the state identification acquisition unit 20 may also have a function to detect the state of the field. In this respect, the state transition method acquisition unit 10 and the state identification acquisition unit 20 can have the same kind of function as the receptor 40. In this case, the state information (rL, P) provided by the state transition method acquisition unit 10 to the determiner 30 can also be referred to as (D1, "content after change"). Also, the state information (rL, P) provided by the state identification acquisition unit 20 to the determiner 30 can be defined as (D2, "content after change").

The actor 50 can be an acting entity associated with an actor's platform 34 (e.g., a program, a circuit, a device, etc.) or an acting entity present in the field (e.g., a program, a circuit, a device, etc.) and the combination of methods of the action of the acting entity. The acting entity may include the processing apparatus 1 itself. The actor 50 can be changed of its control content (e.g., started, changed, terminated, etc.) by the determiner 30 (as an example, here in the actor's platform 34 described below) based on the state transition method information D1 held in the state transition method acquisition unit 10 and the state identification information D2 held in the state identification acquisition unit 20. In the processing apparatus 1, when the actor 50 at the determiner 30 is determined to be activated based on the field state (rL, P), the acting entity based on the information described in the state transition method information D1 may be operated in the action method specified by the state transition method information D1. When the actor 50 is activated or operated, the state of the field can be changed (transitioned).

For the actor 50, the actor 50 is specified by the state transition method information D1 (as an example, here in a Second section D92), but supplemental portions of the actor 50 may also be specified in the state identification information D2 (as an example, here in a Fifth section D95). The types of the actor 50 (e.g., functions, etc.) include, for example, the following. The types of the actor are not limited to the examples below and may be changed as appropriate depending on the state to be transitioned. At least some of the functions of the actor may be incorporated into the actor's platform 34 as fixed elements. However, the subject of the Actor can be in the field. For example, in the following examples, "a particular file", "a device with FIFO characteristics", "a particular node/port", "a particular database", "an entity that executes instructions", etc. can be in the field.

File Actor: A function to change values (e.g., contents, timestamps, etc.) included in a particular file. The file may be a direct memory manipulation, for example, RAMFS.

FIFO Actor: A Function to insert a value into a device (e.g., memory) with FIFO (First In First Out) characteristics.

Network Actor: A function to send packets to a specific node/port.

Device Actor: A function to send features to a specific device (e.g., an actuator, etc.)

DB Actor: A Function to modify specific records in a specific database.

Exec Actor: A function to execute a specified instruction.

Shell Actor: A function that executes specified commands in a shell.

Specific action Actor: A function that performs a specific action, for example, terminating the determiners 30.

It may also be possible to have multiple actors 50 cooperate with one processing apparatus 1. For example, the multiple actors 50 may be configured to operate according to the result of the judgment by the determiner 30. Although FIG. 1 shows an example of multiple actors 50, this number can be changed as needed. In addition, the operations of the multiple actors 50 may be collected to a single judgment result. Depending on the contents specified by the state transition method information D1 (in some cases, furthermore, the state identification information D2), the number of the actors 50 operating as a result of the judgment by the determiner 30, the order in which they operate, etc., may be changed as appropriate.

The processing apparatus 1 may have the function of executing the desired processing by each of the above parts functioning. As described above, the receptor 40 may be created, deleted, or changed based on the state transition method information D1 and the state identification information D2. Also, for the actor 50, based on the state transition method information D1 and state identification information D2, the behavior corresponding to the judgment result by the determiner 30 can be determined. Therefore, the receptor 40 and the actor 50 can be changed according to the processing contents in the processing apparatus 1.

In addition, when both the receptor 40 and the actor 50 perform actions in conjunction with the determiner 30, they can be performed in parallel with the actions of the determiner 30. For example, the receptor 40 can be configured to provide the state information to the determiner 30 independently of the judgment operation by the determiner 30. The actor 50 can also be configured to operate based on the judgment result of the determiner 30 independently of the judgment operation of the determiner 30.

Each functional unit that performs a desired process in the processing apparatus 1, e.g., programs, circuits, devices, etc. to realize that function, may be classified as either a fixed element or a variable element. Among the parts of the processing apparatus 1, the determiner 30 may be the fixed element. While most of the processing apparatus 1 can be treated as the variable element as described above, the determiner 30 may be the fixed element. Details on this point are described below. In FIG. 1, a region R, which may be the fixed element, is illustrated by a dashed line. Everything outside of the region R is an area that corresponds to the variable element.

[Determiner Function]

Figure 2:
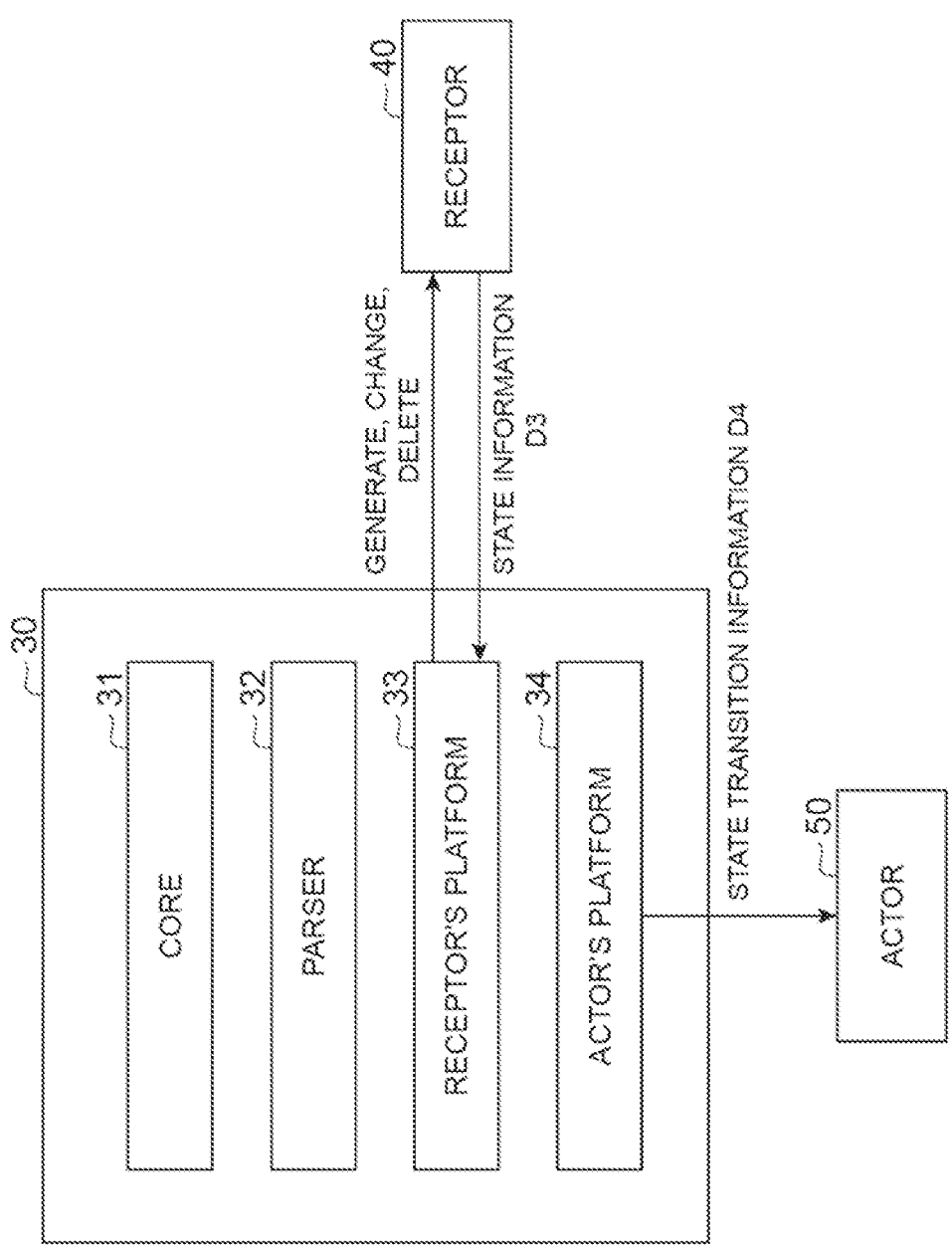
FIG. 2 shows an example of a functional block illustrating the function of the determiner included in the processing apparatus.

Next, the determiner 30 is described with reference to FIG. 2. As shown in FIG. 2, the determiner 30 can be include a Core 31, a Parser 32, a receptor's platform 33 that can be used, for example, as the state information acquisition unit, and an actor's platform 34 that can be used, for example, as the state transition specification unit. In a case where the state transition method information D1 and state identification information D2, for example, include a process equivalent to the process performed by the parser 32 and are provided within the processing apparatus 1 (e.g., the state transition method acquisition unit 10 and the state identification acquisition unit 20), the parser 32 does not have to be present in the determiner 30 or inside the processing apparatus 1.

The core 31 can be a functional unit that compares, judges, or determines, for example, so-called table entries, hashes, etc., the state of the Field (rL, P) received from the receptor 40 with the combination of the actor 50 and the state (rL, P) identified by the state transition method information D1 or the state transition method information D1 and the state identification information D2.

The parser 32 can be a functional unit that performs preprocessing, etc. for handling the state transition method information D1 and the state identification information D2 in the core 31. The preprocessing includes macro-expanding the information described in the state transition method information D1 or the state identification information D2 for use in the determiner 30 (For example, the description included in the state identification information D2 is expanded into the state transition method information D1, etc.). In addition, as the preprocessing step, it may be verified that the information described in the state transition method information D1 and the state identification information D2 (e.g., descriptions pertaining to the receptor 40 or the actor 50) is complete or not. As the preprocessing step, if the state transition method information D1 and/or the state identification information D2 are encrypted by an authorization authentication mechanism or the like, a process to decrypt them or the like may be performed. However, the preprocessing is not limited to these processes, and may be changed as appropriate depending on the operating environment of the determiners 30, the description method of the state transition method information D1 and state identification information D2, etc.

The receptor's platform 33 can be a functional unit that obtains, from the receptor 40, the field state (rL, P) specified in the state transition method information D1 or the state transition method information D1 and the state identification information D2. The information identifying the field state (rL, P) sent from the receptor 40 to the receptor's platform 33 can correspond to state information D3. The state information D3 sent to the receptor's platform 33 can be passed to the core 31. In the case where multiple receptors 40 are provided, the receptor's platform 33 can be configured to pass the state information D3 sent from the multiple receptors 40 to the core 31 respectively. The receptor's platform 33 may hold the state information D3 in a queue or the like before passing it to the core 31.

The receptor's platform 33 control the receptors 40 based on the state transition method information D1, or the state transition method information D1 and the state identification information D2. Specifically, based on the description of the state transition method information D1 and the state identification information D2, the receptor's platform 33 can create, modify, or delete the receptors 40.

The actor's platform 34 can be a functional unit that controls the actor 50 based on the state transition method information D1 or the state transition method information D1 and the state identification information D2. Control of the actor 50 by the actor's platform 34 means, for example, the control of the actor 50 by the actor's platform 34 can be defined as the actuation of the actor 50 by specifying an action to the actor 50 that is the acting entity. For example, the actor's platform 34 may have a function to activate or operate the actor 50 based on the state transition instruction D4 for the actor 50. The actor's platform 34 may, for example, start, end or change control over the actor 50 based on the description of the state transition method information D1 and the state identification information D2.

Figure 3:
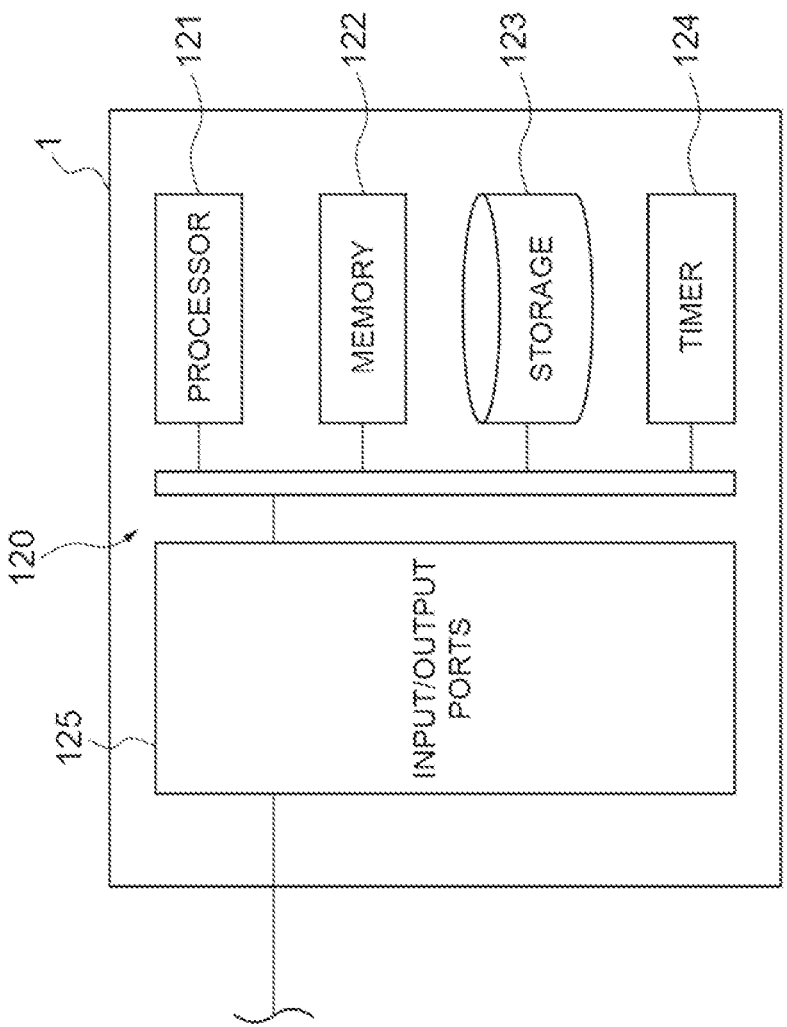
FIG. 3 illustrates an example of the hardware configuration of the processing apparatus.

The above processing apparatus 1 may be configured by one or more computers. For example, the processing apparatus 1 has a circuit 120 shown in FIG. 3. The circuit 120 has one or more processor(s) 121, a memory 122, storage 123, a timer 124, and input/output ports 125. The storage 123 has a computer readable storage medium, such as a hard disk, for example. The storage medium stores a program for causing the processing apparatus 1 to perform the processing procedures described below. The storage medium may be an extractable medium such as a nonvolatile semiconductor memory, a magnetic disk and an optical disk. The memory 122 temporarily stores the program loaded from the storage medium of the Storage 123 and the results of calculations by the processor 121. The processor(s) 121 cooperates with the memory 122 to execute the above program, thereby constituting each functional unit described above. The timer 124 measures elapsed time by, for example, counting reference pulses of a fixed period. The input/output ports 125 input/output signals to/from the control object in accordance with commands from the processor(s) 121.

When the processing apparatus 1 is composed of multiple computers, the state transition method acquisition unit 10, the state identification acquisition unit 20, and the determiner 30 may each be realized by individual computers. Alternatively, each of these functional units may be realized by a combination of two or more computers each. In these cases, the multiple computers may be connected in communication with each other and may cooperatively execute the processing procedures described below. The hardware configuration of the processing apparatus 1 is not necessarily limited to one in which each functional unit is configured by a program. For example, each functional module of the processing apparatus 1 may be composed of dedicated logic circuits or ASICs (Application Specific Integrated Circuit) that integrate these circuits. The configuration of the processing apparatus 1 may, for example, be configured as a system such as so-called cloud computing, in which the functional unit for operation and display is substantially separated from the functional unit for processing.

The core 31 of the determiner 30 may be configured to perform pattern matching of bit strings, etc., in hardware, for example, or it may be implemented by executing an algorithm described for pattern matching. As an example, in a state where hardware or an algorithm that can operate as the determiner 30 can exist in one computer, a program or the like that specifies the function as the state transition method acquisition unit 10 and the state identification acquisition unit 20 that works with the determiner 30, the function as the processing apparatus 1 can be realized. Furthermore, when the state transition method information D1 and the state identification information D2 are specified, the judgment operation by the determiner 30 in the processing apparatus 1 can be performed.

[Operation Identification Information that Specifies the Operation of the Determiner]

As described above, in the processing apparatus 1 described in this embodiment, the state transition method information D1 and the state identification information D2 can specify the operation of the determiners 30 of the processing apparatus 1. For example, the state transition method information D1 includes information that can be classified into two sections, and the state identification information D2 includes information that can be classified into three sections. The information included in the state transition method information D1 and the information included in the state identification information D2 may be collectively referred to as "operation identification information". Of the operation identification information D0, the state transition method information D1 is information that can be handled mainly by the developer of the system to which the processing apparatus 1 is applied, and the state identification information D2 is information that can be handled mainly by the administrator or user of the system to which the processing apparatus 1 is applied. However, it is not limited to this classification.

FIG. 4 shows the relationship among the operation identification information D0, the state transition method information D1, and the state identification information D2, and the five sections (first to five sections). As shown in FIG. 4, the state transition method information D1 may include a first section D91 and a second section D92. In addition, the state identification information D2 may include a third section D93, a fourth section D94 and a fifth section D95 may be included. It goes without saying that the sections are provided to classify the information included in the operation identification information D0 according to its type, and it is not mandatory to distinguish them as sections. In addition, a section described in this embodiment specifies the content of information to be described, and the method of description is not limited. In addition, the information included in from the first section D91 to the fifth section D95 may be prepared by a person, such as a user of the processing apparatus 1, or it may be automatically generated by a system or the like that operates the processing apparatus 1.

The first section D91, describes the association between the state information (rL, P), which is the state of the field, and the actor 50. In the first section D91, the type of field state that may be handled by the Determiner 30 can be specified by the label (rL). It can also specify the Actor associated with that state information (rL, P) (or the Receptor and Profile (P) that obtains the state of the field corresponding to that State Information (rL, P)). Optionally, information may be added to the first section D91 to specify actions to be taken when certain conditions are met. As an option, for example, "Option 1" specifies that in the case where the Receptor 40 acquires the exact same field status (rL, P) two or more times in a row, the actor 50 will not start or operate regardless of the result of the judgment by the determiner 30. As other options, for example, "Option 2" specifies that the label (rL) specified in the First section is the target of observation regardless of the information in the Third section, etc., described below. "Option 3" specifies handling of values with width as the profile (P). Options may be added or changed as appropriate.

The second section D92 describes the specification of the Actor 50 and how they operate. In the first section D91, the first section D91 describes the association between the state information (rL, P) and the actor 50. The second section D92 can be used to describe the specific actions of the actor 50 described in the first section D91. The information described in the second section D92 may be directly described in the first section D91. For example, the first section D91 and the second section D92 can be combinedly described to directly specify the method of operation of the actor 50.

The third section D93 can be used to describe the specification of the label (rL) that is the target of observation (target of judgment by the determiner 30) in the processing apparatus 1. In the third section D93, when a description specifying a label (rL) is made, the receptor 40 corresponding to this label (rL) can be generated. It is also possible to specify a predetermined state by specifying a profile (P) for the label (rL).

The fourth section D94 can be a description of the specification of the information necessary to generate the receptor 40 corresponding to the label (rL). As described above, there may be multiple types of receptors 40 (e.g., functions, etc.), and the information required to generate a receptor 40 may be specified for each type (e.g., function, etc.). For example, for a file receptor, the location (e.g., path) where the file receptor is located, and for a network receptor, the port number where packets are received may be specified.

The fifth section D95 can be a description of information other than the information specified in the First section D91 to the fourth section D94 above, which specifies the necessary information for the operation of the determiner 30, the actor 50, etc. For example, the location and file name of the log file and information to be macro-expanded in the operation identification information D0 may be specified. For example, it may specify information to be linked with devices, circuits, programs, etc. in the field, such as authentication and authorization mechanisms to ensure security.

Among the above first section D91 through the fifth section D95, if there is information corresponding to, at least, the first section D91, the second section D92, and the fourth section D94, for example, it is possible to make the receptor 40 and the actor 50 can be made the variable elements while the determiner 30 is the fixed element, and it is possible to add, delete, or change the functions of the processing apparatus 1 without substantially stopping the operation of the processing apparatus 1. In addition, the information corresponding to the third section D93 is normally an essential configuration for the operation of the processing apparatus 1, but as described above, when the "Option 2" is specified in first section D91 that specifies the label (rL) specified in the first section D91 as the target of observation without information such as in the third section, the information corresponding to third section D93 can be omitted. In addition, since the fifth section D95 is supplementary information not included in the other four sections, there are many cases where the processing apparatus 1 is operated without the information corresponding to the fifth section D95.

The information included in the above five sections can realize various functions even when only a portion of the information is present. For example, if there is information corresponding to at least the first section D91, it can function, for example, as a selector that selects the behavior specification of the actor corresponding to the field state information (rL, P). If there is information corresponding to at least the second section D92, it is possible, for example, to make the system function as an actor library that summarizes the actors and their operation identifications. If there is information corresponding to at least the third section D93, it can function, for example, as a switch that specifies the receptors 40 to be actually operated. Also, if there is information corresponding to at least the fourth section D94, it can function, for example, as a kind of management unit for actually making the receptor 40 function as a variable element, etc. Also, if there is information corresponding to at least the fifth section D95, it can function, for example, as a kind of management unit to make the determiner 30, the receptor 40, and the actor 50 function as a variable element, etc.

Also, if there is information corresponding to at least the first section D91 and the second section D92, it can function, for example, as a processing apparatus with the receptor 40 as a fixed element. For example, in the case of no need to change the function of the processing apparatus 1 without substantially stopping the operation of the processing apparatus 1, if there is information corresponding to at least the first section D91 and the second section D92, it is possible to operate the Processing apparatus. Similarly, if there is information corresponding to at least the first section D91 and the third section D93, for example, a selector to select the actor's operation specification corresponding to the field state (rL, P) can function to specify a label to actually obtain the state information (rL) or Receptor 40. In addition, if there is information corresponding to at least the first section D91 and the fourth section D94, for example, a selector that selects the actor's operation specification corresponding to the field state (rL, P) can function the label (rL) or the receptor 40 as a variable element, and so on. In addition, if there is information corresponding to at least the first section D91 and the fifth section D95, it is possible that, for example, a selector that selects the actor's operating specification corresponding to the field state (rL, P) can specify the selector's operating conditions, etc. as a variable element.

Furthermore, if there is information corresponding to at least the first section D91, the second section D92, and the third section D93, a Processing apparatus, for example, with the receptor 40 as a fixed element can function to specify the label (rL) that actually obtains the state information, or to specify receptor 40. In addition, if there is information corresponding to at least the first section D91, the second section D92, and the fifth section D95, it is possible, for example, for a processing apparatus with the receptor 40 as a fixed element to function by specifying the operating conditions of the processing apparatus as a variable element, etc. Furthermore, if there is information corresponding to the first section D91, the second section D92, the third section D93, and the fourth section D94, for example, it is possible to realize a processing apparatus 1 that can specify the receptors 40 to be used for processing. In addition, if there is information corresponding to the first section D91, the second section D92, the third section D93, and the fifth section D95, for example, a processing apparatus 1 with (a) fixed receptor(s) 40 can be realized.

In addition, the processing apparatus 1 handles the information included in the above five Sections by dividing it into two pieces of information: state transition method information D1 and state identification information D2. However, they may be combined into a single piece of information and handled as a single piece of information, for example, the operation identification information D0. Each of the five sections may also be handled as individual information. The five sections may be further divided and handled separately. If there is at least the information corresponding to the first section D91, the second section D92, and the fourth section D94 described above, a processing apparatus can be configured so that the functions of the processing apparatus 1 can be added, deleted, changed, etc., independently from the operation of the determiner 30. For example, it can be used for programs, devices, and systems that require constant operation, such as a device including a computer antivirus program that operates on the so-called "cloud", a security system used by a security company, a disaster prevention system, a medical system, an FX (foreign exchange margin trading) system, an automobile CASE (Connected, Autonomous, Shared/Service, Electric) systems, carrier systems used by cell phone companies, and information infrastructure including IoT, and so on. The information included in the first section D91 and the second section D92 can correspond to the information that specifies the contents of the comparison in the determiner 30 and the operation pertaining to the state transition according to the result of the comparison. The information included in the fourth section D94 can correspond to information pertaining to the generation of a state information generator, for example, the receptor 40, to generate state information from information pertaining to the field status.

In addition, the information included in the first section D91 to the fifth section D95 above can affect the generation, modification, and deletion of the receptors 40 by the receptor's platform 33 of the determiner 30 as described above. For example, the generation of the receptor 40 can be performed by the receptor's platform 33 when the required information is described in the first section D91, the fourth section D94 (and, in some cases, in addition, the third section D93 and the fifth section D95). In addition, changes to the receptor 40 can be performed by the receptor's platform 33 when the description in the first section D91, the fourth section D94 (and, in some cases, in addition, the third section D93 and the fifth section D95) is changed. Deletion of the receptors 40 can also be performed by the receptor's platform 33 if the description in the first section D91, the fourth section D94 (and, in some cases, in addition, the third section D93 and the fifth section D95) is deleted or changed to an incomplete state.

Similarly, the information included in the first section D91 to the fifth section D95 above can affect the initiation, modification, and termination of control over the actor 50 by the actor's platform 34 of the determiner 30 as described above. For example, the initiation of control over an actor 50 (i.e., the beginning of control over a particular actor 50) can be performed by the actor's platform 34 if the necessary information is described in the second section D92 (and, in some cases, in addition, the fifth section D95). In addition, a change of control over an actor 50 (i.e., a change of control over a particular actor 50) can be performed by the actor's platform 34 if the description in the second section D92 (and, in some cases, in addition, the fifth section D95) is changed. The termination of control over the actor 50 (termination of control over a particular actor 50) can also be performed (e.g., changed to end control or not initiated by the actor's platform 34) by the actor's platform 34 if the description in the second section D92 (and, in some cases in addition, the section D95) is deleted or changed to an incomplete state. If the acting entity of the actor 50 itself is one that exists in the field, it is not necessarily to be changed based on the first section D91 to the fifth section D95. The sections D91 through D95 may affect the control of the method of operation for the actor 50.

[Processing Methods]

Figure 5:
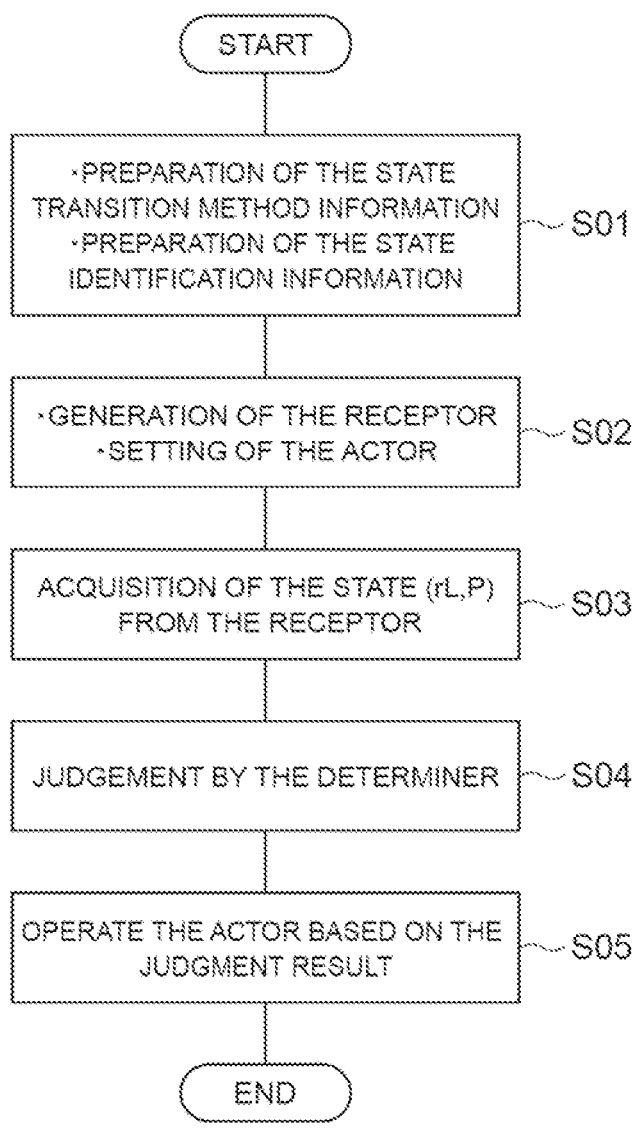
FIG. 5 is a flow diagram illustrating an example of a processing method by the processing apparatus.

Next, the processing method (procedure) by the processing apparatus is explained with reference to FIG. 5.

First, in the processing apparatus 1, the state transition method information D1 in the state transition method acquisition unit 10 and state identification information D2 in the state identification acquisition unit 20 can be prepared (S01). These information can be prepared, for example, by the developer or user of the processing apparatus 1. For one processing, at least one set of state transition method information D1 and the state identification information D2 can be prepared. These state transition method information D1 and the state identification information D2 may be assigned information for identifying the relationship (e.g., a flag identifying the target processing).

The state transition method information D1 can be retained in the state transition method acquisition unit 10. The state identification information D2 can be retained in the state identification acquisition unit 20. As a result, a receptor 40 that can be linked to the determiner 30 can be generated and an actor 50 corresponding to the process can be set (S02). As described above, the state transition method information D1 or the state transition method information D1 and state identification information D2 can be used to specify the receptor 40 and the actor 50. Therefore, the state transition method information D1 and the state identification information D2 are prepared as described above (S01), and based on these information, the necessary Receptor 40 can be generated and prepared, and the operation specification of the actor 50 can be prepared. The generated receptor 40 can be linked as necessary with the target X (sensor, etc.) to obtain the field state (rL, P). The actor 50 can also be linked to a device or other device to perform a given process.

The above procedure can prepare the conditions for the execution of a given process by the processing apparatus 1. Once the above procedure has prepared the processing apparatus 1 to perform the processing, the processing using the determiners 30 can begin.

Specifically, the state transition method information D1 and the state identification information D2 are sent to the determiner 30, and the state transition method information D1 and the state identification information D2 can be preprocessed in the parser 32 of the determiner 30. Then, the receptor's platform 33 can obtain the field state (rL, P) from the receptor 40 (S03). Then, the core 31 of the determiner 30 can judge based on the field state (rL, P) and the state transition method information D1 or the state transition method information D1 and the state identification information D2 (S04). Then, based on the judgment result (e.g., the result of the comparison), the actor's platform 34 can activate or operate the actor 50 as needed (S05). This allows the actor 50 to perform actions based on the judgment result.

Note that this acquisition of the field state (rL, P) from the receptor 40 (S03) to the activation of the actor 50 (S05) based on the judgment result may be a series of operations performed each time the field state (rL,P) is acquired. The receptor 40 may repeat, for example, detecting changes in the field state (rL, P) and notifying the state (rL, P) to the determiner 30 when the field state (rL, P) changes. From the above operations, event-driven processing can be performed. It goes without saying that the above operations can be combined to enable more complex algorithms to be executed.

Next, the method (procedure) for changing the processing in the processing apparatus 1 is explained with reference to FIG. 6.

One case of changing the content of processing in the processing apparatus 1 is to change (including addition or deletion) a part of the processing that has been performed before. As described above, the processing being performed in the processing apparatus 1 can be defined by the state transition method information D1 held in the state transition method acquisition unit 10 and the state identification information D2 held in the state identification acquisition unit 20. Therefore, by changing these information, the processing contents can be changed.

Figure 6:
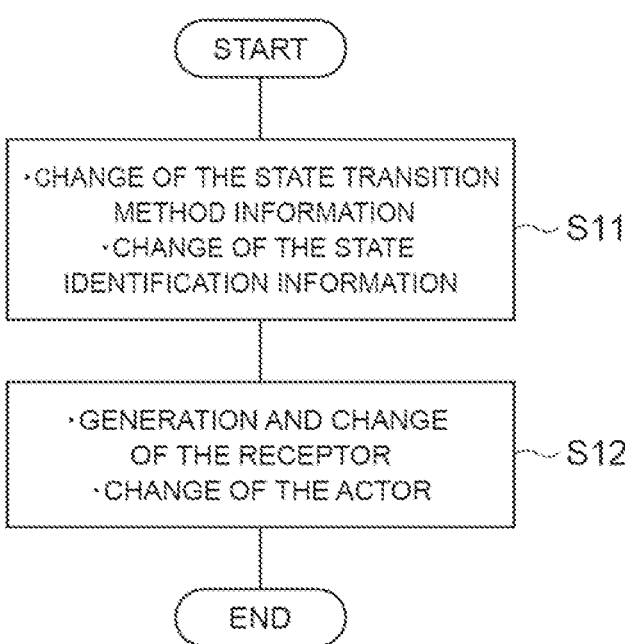
FIG. 6 is a flow diagram illustrating an example of a processing method by the processing apparatus.

Therefore, when changing the processing content, as shown in FIG. 6, it can be done by changing the state transition method information D1 in the state transition method acquisition unit 10 and/or the state identification information D2 in the state identification acquisition unit 20 (S11). These information changes can be performed, for example, by the user of the processing apparatus 1. The information to be changed may be either one or both of the state transition method information D1 and the state identification information D2. The changed state transition method information D1 can be retained in the state transition method acquisition unit 10. The changed state identification information D2 can be retained in the state identification acquisition unit 20. As a result, based on the changed state transition method information D1 and the state identification information D2, (a) receptor(s) 40 that can be linked to the determiner 30 can be generated and an actor 50 corresponding to the process can be set (S12).

As described above, the receptor 40 and the actor 50 can be specified by the state transition method information D1, or the state transition method information D1 and the state identification information D2. Therefore, if the state transition method information D1 and/or the state identification information D2 is changed as described above (S11), the required receptors 40 and the actors 50 can be changed based on changes in these information. The generated receptor 40 can be linked as necessary with the target X (sensor, etc.) to obtain the field state (rL, P). The actor 50 can also be linked to a device or other device to perform a given process.

The above procedure can prepare the conditions for processing after the change by the processing apparatus 1. Once the above procedure prepares the processing apparatus 1 to perform the processing, the processing using the determiner 30 can be started based on the modified state transition method information D1 and the state identification information D2.

[Startup, Stop, and Shutdown of Processing Apparatus 1]

The processing apparatus 1 can start processing by the determiner 30 when the state transition method information D1 held in the state transition method acquisition unit 10 and the state identification information D2 held in the state identification acquisition unit 20 are prepared, as described above. This state in which processing using the determiners 30 can be started in the processing apparatus 1 is called "startup" of the processing apparatus 1. A change from a state in which processing using the determiners 30 can be performed in the processing apparatus 1 to a state in which such processing cannot be performed is referred to as "stop" or "shutdown" of the processing apparatus 1.

The "stopped" state of the processing apparatus 1 refers to a state in which any of the functional units of the processing apparatus 1 are operating, but cannot operate as the processing apparatus 1. For example, if the state transition method information D1, etc. is incomplete, the processing apparatus 1 can be said to be in a stopped state because it does not function even if the determiners 30 are operating. This stopped state of processing apparatus 1 may be used for the purpose of improving the performance of the system constructed with the processing apparatus 1, etc., such as security, power saving, processing speed, etc.

The "shutdown" of the processing apparatus 1 refers to the state in which all functional units of the processing apparatus 1 described above are not operating. For example, if the result of the judgment process by the determiner 30 is defined that an actor 50 is started or operated to terminate the operation of the processing apparatus 1 in the state transition method information D1 or the state identification information D2, the operation of the processing apparatus 1 can be terminated by the result of the judgment by the determiner 30. The operation of the processing apparatus 1 may also be terminated by stopping the operation of the processing apparatus 1 itself. For example, in the case of a processing apparatus 1 in which the determiner 30 operates by software, the processing apparatus 1 can be terminated by sending a signal to the processing apparatus 1 via an OS or the like to terminate the operation of the determiner 30. The operation of the processing apparatus 1 may also be physically terminated by turning off the power to the processing apparatus 1 or to the computer on which the processing apparatus 1 operates.

[Variation of Device Configuration.]

In the above embodiment, the operation is described assuming that only one type of judgment is made in the determiner 30 of one processing apparatus 1. However, it is also possible to configure a configuration in which multiple types of judgments (e.g., comparisons) are made in the determiners 30 of one processing apparatus 1. It is also possible to have two processing apparatus 1 and have them work together. For example, it may be configured to change the operation of the other processing apparatus 1 based on the operation of the actor in one processing apparatus 1.

Figure 7:
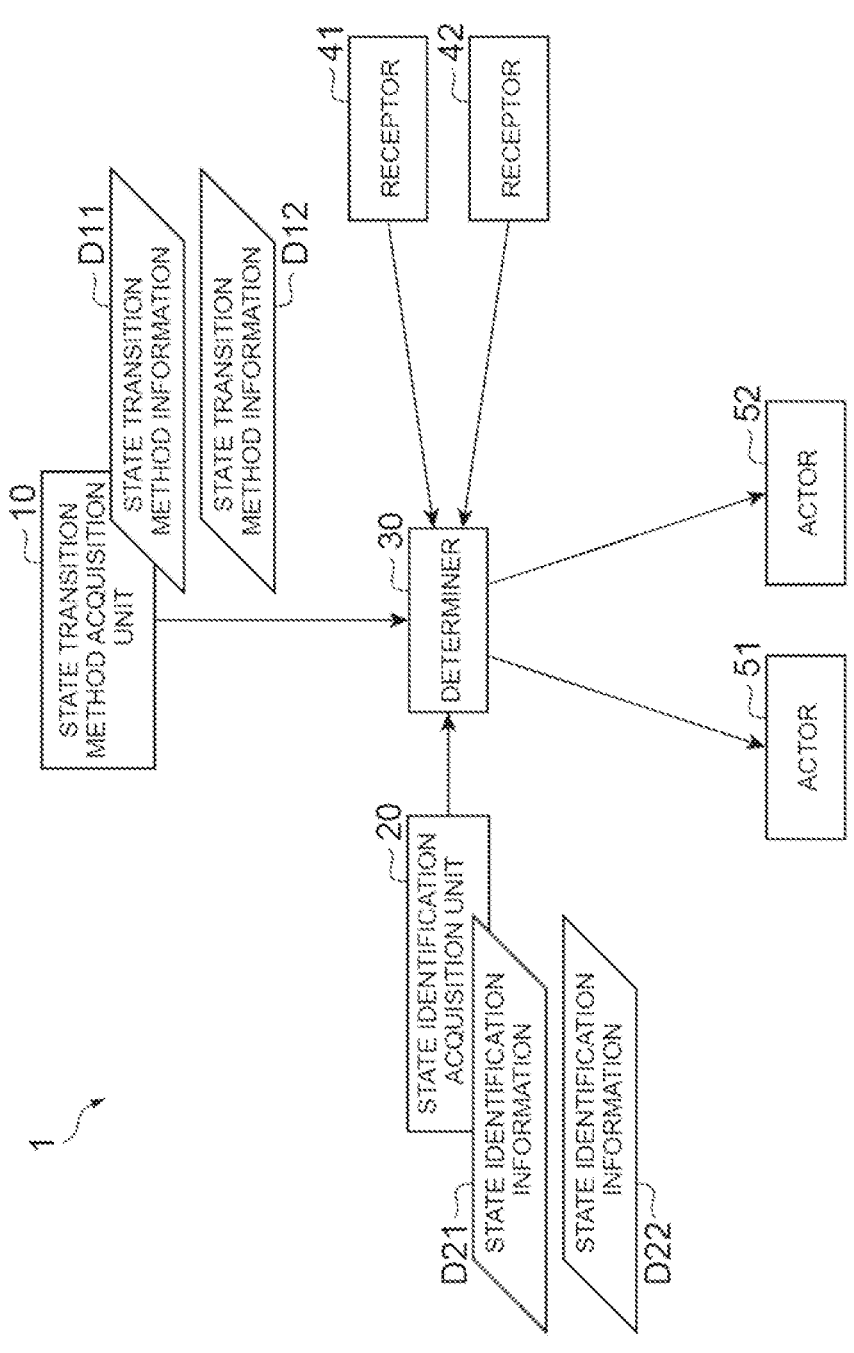
FIG. 7 shows a variation on the configuration of the processing apparatus.

FIG. 7 illustrates the configuration when two types of judgements are made in the determiner 30 of one processing apparatus 1. In the example shown in FIG. 7, for example, the state transition method acquisition unit 10 of the processing apparatus 1 holds two types of state transition method information D11 and D12. Also, for example, the state identification acquisition unit 20 holds two types of state identification information D21 and D22. Of these, the state transition method information D11 and the state identification information D21 are a pair, and that they specify the provisions for a receptor 41 and an actor 51. In addition, the state transition method information D12 and the state identification information D22 are a different pair from the pair of the state transition method information D11 and the state identification information D21, and that they specify the provisions for a receptor 42 and an actor 52. In such a processing apparatus 1, two types of judgments would be made. For example, the determiner 30 of the processing apparatus 1 can perform the judgment specified by the state transition method information D11 and the state identification information D21, and can also perform the judgment specified by the state transition method information D12 and state identification information D22. Since the contents of judgments in the determiners 30 are specified by the state transition method information and the state identification information, the determiners 30 need only repeat judgments based on these specifications. In this way, the processing apparatus 1 may be configured to perform multiple types of judgments.

Furthermore, the above embodiment describes a configuration in which one determiner 30 is installed in one processing apparatus 1, but it is also possible to have a configuration in which multiple functional units that make judgments according to the type of judgments to be made in the processing apparatus 1 are installed and operate independently.

18

Figure 8:
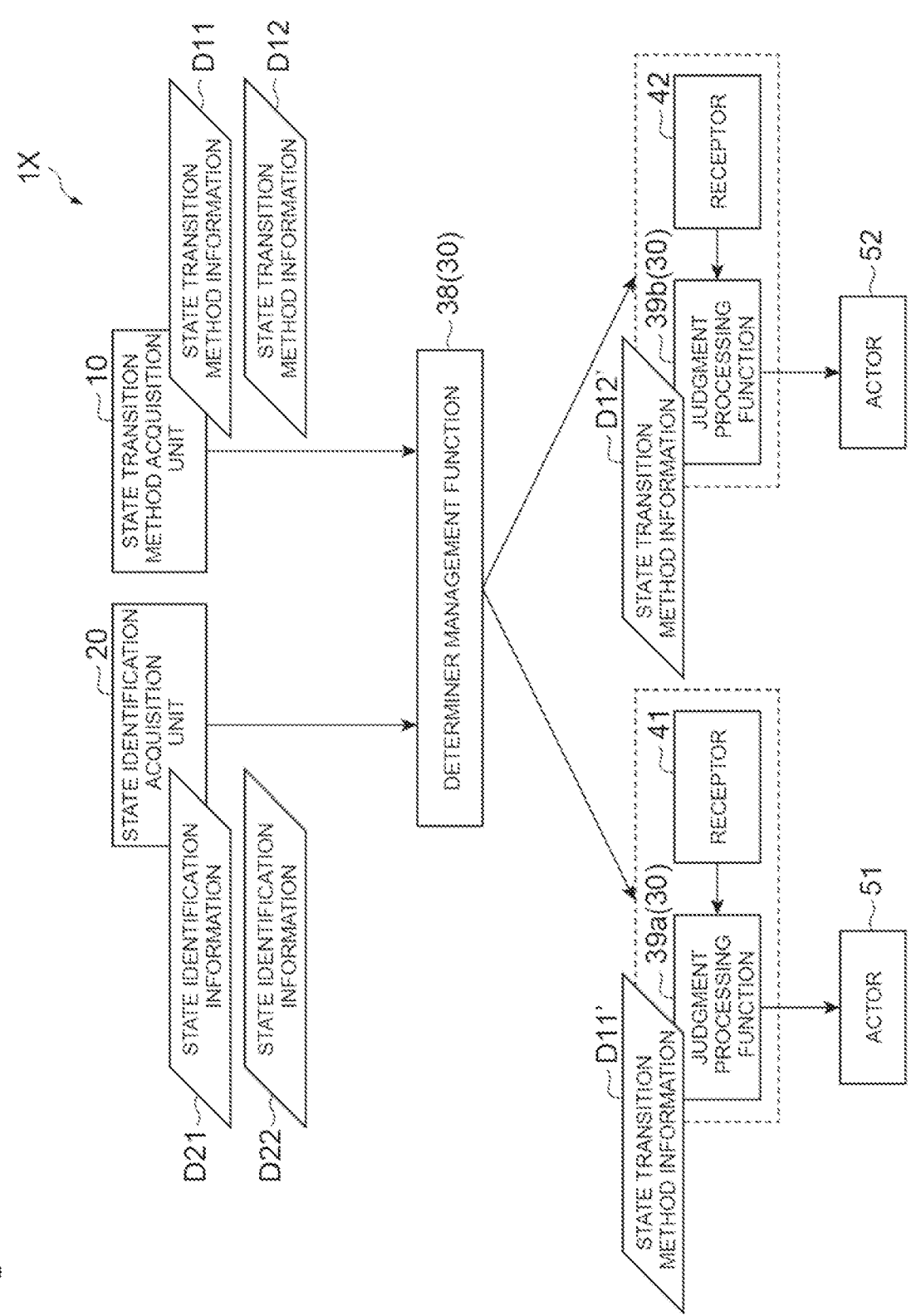
FIG. 8 shows a variation on the configuration of the processing apparatus.

Compared to the processing apparatus 1 shown in FIG. 7, a processing apparatus 1X shown in FIG. 8 includes the determiner 30 with a determiner management function 38 and a judgment processing function 39. The determiner management function 38 can be a function to coordinate with the state transition method acquisition unit 10 and the state identification acquisition unit 20, among the functions as the determiner 30. For example, the determiner management function 38 can have functions as a parser 32 that performs preprocessing related to the state transition method information D11, D12 and the state identification information D21, D22 among the determiners 30 shown in FIG. 2, and functions as the receptor's platform 33 that controls the receptors 41, 42 based on these information.

On the other hand, the Judgment processing function 39 may have functions such as judgment and activation of the actors 51 and 52 based on the judgment results. For example, the Judgment processing function 39 may include a function as the core 31 that makes judgments based on state information, and the function as the actor's platform 34, which performs control related to the actor. As shown in FIG. 8, the judgment processing function 39 can be configured to provide one function associated with one receptor. Therefore, the judgment processing function 39 may be associated with the state transition method information D11, D12 (or, for example, in addition to the state transition method information D11, D12, the corresponding state identification information D21, D22) associated with each receptor. In the example shown in FIG. 8, two judgment processing functions 39a and 39b are shown as the judgment processing functions 39. The judgment processing function 39a is associated with the receptor 41 specified in the state transition method information D11', and the judgment processing function 39b is associated with the receptor 42 specified in the state transition method information D12'. In addition, the state transition method information D11' specifies the activation, operation, etc. of the actor 51 based on the judgment result, and the state transition method information D12' specifies the activation, operation, etc. of the actor 52 based on the judgment result.

The determiner management function 38 of the processing apparatus 1X is able to generate, modify, and delete judgment processing functions 39 and receptors based on the combination of the state transition method information and the state identification information retained in its own device. For example, if the state transition method information D11 and the state identification information D21 define to operate the actor 51 by the result of the judge based on the state Information to be acquired by the receptor 41, the determiner management function 38 generates the judgment processing function 39a and the receptor 41, so that the judgment can be made based on these state transition method information D11 and state identification information D21. For example, if neither the state transition method information nor the state identification information is retained in the device, the judgment processing function 39a and the receptor are not generated because the device does not retain sufficient information to generate the judgment processing function 39 and the receptor. In this way, in the processing apparatus 1X, because the judgment processing function 39 and the receptors are generated, modified, deleted, etc. with being associated each other based on the determiner management function 38, the receptors as well as the judgment processing function 39 may be the fixed elements, e.g., a monolithic configuration, or they may be the variable elements as in the processing apparatus 1.

In the Processing apparatus 1X shown in FIG. 8, the determiner management function 38 that manages determiner and the judgment processing function 39, which actually performs judgment operations, are shown as an example of a configuration in which they are arranged separately. In addition, each judgment processing function 39 performs judgment operations pertaining to the state information acquired by one receptor each. Therefore, the judgment operation in the judgment processing function 39 can be simplified because the judgment performed in each judgment processing function 39 is only the judgment content corresponding to one receptor. As a result, the processing apparatus 1X can shorten the processing time from the acquisition of state information at receptors (41, 42) to the state transition operation of actor 50 based on the judgment result. Although FIG. 8 shows one variation of the implementation of the determiner 30, the implementation form of the determiner 30 is not limited to the example shown in FIG. 8. In one system functioning as the processing apparatus 1, if there are functions corresponding to the four functional units of the core 31, the parser 32, the receptor's platform 33, and the actor's platform 34, the same functionality as that of the determiners 30 can be realized. Therefore, the specific implementation method (e.g., configuration, etc.) can be changed as needed. In cases where the state transition method information D1 and the state identification information D2 include pre-processing, the parser 32 can be implemented without existing inside the determiner 30 or the processing apparatus 1.

Figure 9:
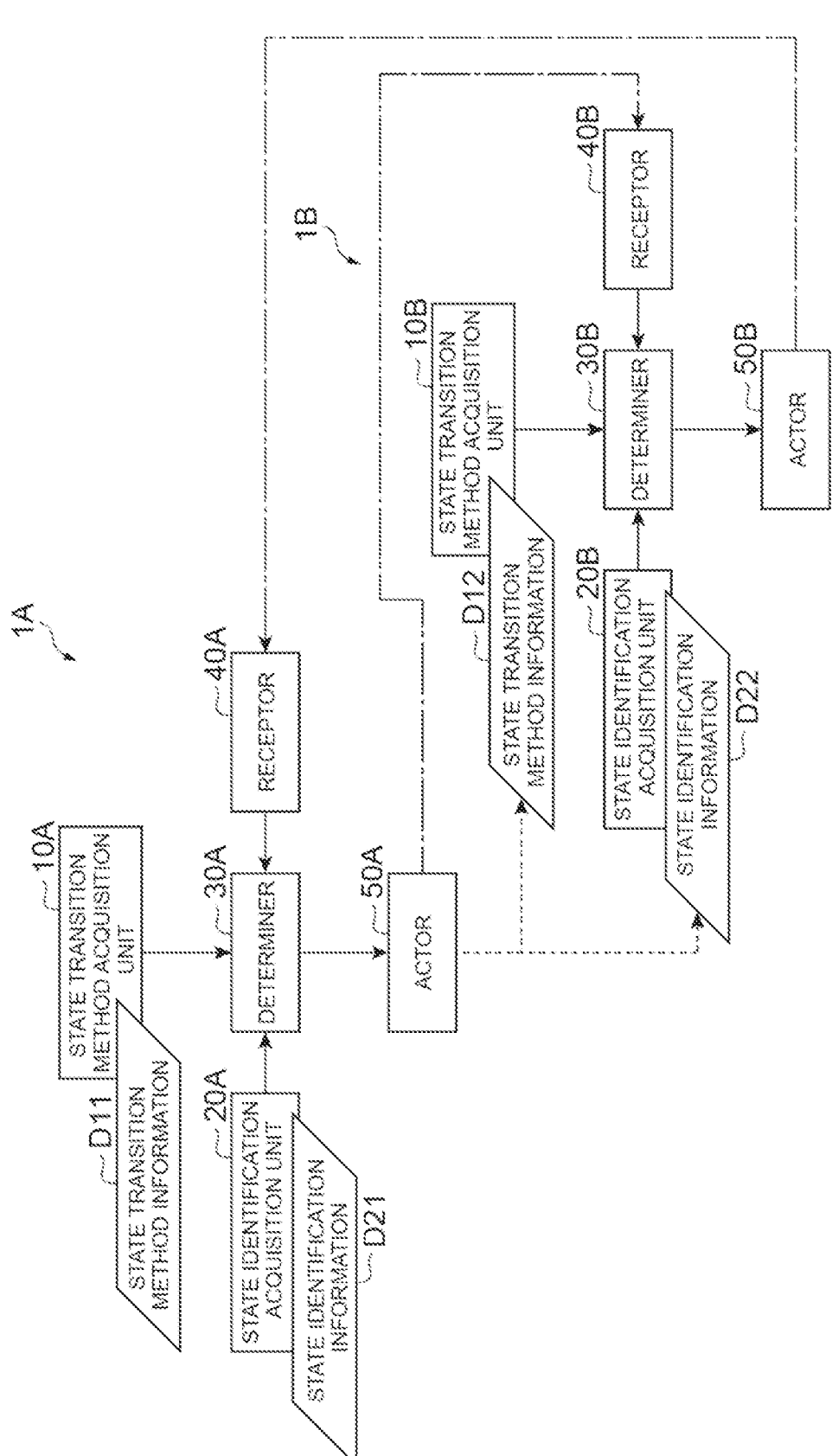
FIG. 9 shows a variation on the configuration of the processing apparatus.

Next, an example of a configuration in which multiple processing apparatus are arranged in coordination is described. FIG. 9 illustrates a configuration in which two processing apparatus 1A, 1B operate in coordination. In the example shown in FIG. 9, two processing apparatus 1A, 1B with the same configuration as the processing apparatus 1 shown in FIGS. 1, 7, etc. are shown. The processing apparatus 1A has a state transition method acquisition unit 10A, a state identification acquisition unit 20A, a determiner 30A, a receptor 40A, and an actor 50A. In addition, the processing apparatus 1A is specified its operation by the state transition method information D11 and the state identification information D21. The processing apparatus 1B includes a state transition method acquisition unit 10B, a state identification acquisition unit 20B, a determiner 30B, a receptor 40B, and an actor 50B. In addition, the processing apparatus 1B is specified its operation by the state transition method information D12 and the state identification information D22. In this case, the behavior of the actor 50A of the processing apparatus 1A, which can be activated or operated as a result of the judgment by the determiner 30A, is a change or update of the state transition method information D12 and/or the state identification information D22 (FIG. 9 shows the case of changing the state transition method information D12 and the state identification information D22). In this case, depending on the result of the judgment in the processing apparatus 1A, the state transition method information D12 and/or the state identification information D22, which specify the behavior of the processing apparatus 1B, will be changed according to the result of the judgment in the processing apparatus 1A, and the behavior of the processing apparatus 1A and the processing apparatus 1B will be linked. The processing apparatus described in the above embodiment may be configured such that multiple devices are linked as described above.

In the processing apparatus 1A shown in FIG. 9, the state transition method information (D11, D12) and the state identification information (D21, D22), for example, are changed into the state transition method acquisition unit 10A and the state identification acquisition unit 20A, and then the determiner 30B is terminated, it is possible to transition to the processing apparatus in FIG. 7 with the processing apparatus 1A still operating. If this operation is reversed, needless to say, it is possible to transition to the processing apparatus 1A and 1B in FIG. 9 while leaving the processing apparatus 1 in FIG. 7 in operation. In this way, a processing apparatus 1 can divide its operation and functions into multiple processing apparatus 1, etc. without stopping its operation, or conversely, it can combine the operation and functions of multiple processing apparatus 1, etc. into one or more processing apparatus 1.

In addition, when dividing the operations and functions of the processing apparatus 1, by dividing the operations and functions into layers from abstract to concrete, so-called libraries and middleware, for example, can be formed or changed without stopping the entire system.

In addition, multiple processing apparatus 1, etc. may be operated by sharing or duplicating any components and their combinations included in the operation identification information D0. For example, in the processing apparatus 1 shown in FIG. 1, the state transition method information that is shared or duplicated of the state transition method information D1 in the processing apparatus 1, and the state identification information modified as necessary for the duplication of the state identification information D2 of the processing apparatus 1 (in this case, D2') are prepared. Furthermore, the processing apparatus 1 specifies the operation of the actor 50 that the replication destination processing apparatus operates with the state transition method information D1 and the state identification information D2' as the state transition method information D1 and the state identification information D2 in it. In this case, the processing apparatus 1 can operate the replication destination processing apparatus as a self-replication. By repeating this operation, the processing apparatus 1 can self-reproduction. In addition to its own operation identification information D0, the processing apparatus 1 can also activate and operate a new processing apparatus 1, etc. using any operation identification information D0.

Note that when there are two processing apparatus 1A, 1B as shown in FIG. 9, the coordination between these processing apparatus 1A, 1B, the coordination between them is not limited to changes and updates the state transition method information D12 and/or the state identification information D22 due to the actions of actor 50A based on the judgment results explained above. For example, the processing apparatus 1B may be positioned as one of the actors 50A of the processing apparatus 1A. For example, as an action of the actor 50A based on the judgment result, an action to the receptor 40 in the processing apparatus 1B (e.g., transmission of information) can also be specified. In this case, the operation identification information pertaining to the judgment in processing apparatus 1B (e.g., in this example, the state transition method information D12 and the state identification information D22) is not changed, but the information subject to judgment can be changed according to the judgment result of the processing apparatus 1A. In this case, feed-forward control can be realized from the processing apparatus 1A to 1B. For example, as an action of the actor 50B based on the judgment result, an action to the receptor 40A (e.g., sending information) in the processing apparatus 1A is specified, the processing apparatus 1A may be positioned as one of the actor 50B. Feedback control can be achieved by creating a loop structure in the coordination between the processing apparatus 1A and 1B. This loop structure can be realized with any one or more processing apparatus 1, for example, and a processing apparatus other than the processing apparatus 1 may be members of the loop, for example. Thus, the method of coordination between the processing apparatus 1A and 1B is not particularly limited. The various information handled by the processing apparatus 1B can be changed by the actions of the actor 50A based on the result of the judgment.

[For Self-Referencing Operation.]

The processing apparatus 1 described in the above embodiment is capable of self-referential operation. The self-referential operation is to change the contents (e.g., functions, etc.) of the operation of the device based on the results of the judgment by the determiner 30 in the device. When the actor 50 described above is activated or operated, etc., the state of the field can be changed or transitioned. What the actor 50 changes is not particularly limited as long as it exists in the field. Therefore, it may be configured to change the state transition method information D1 or the state identification information D2, which are variable elements existing in the field.

Figure 10:
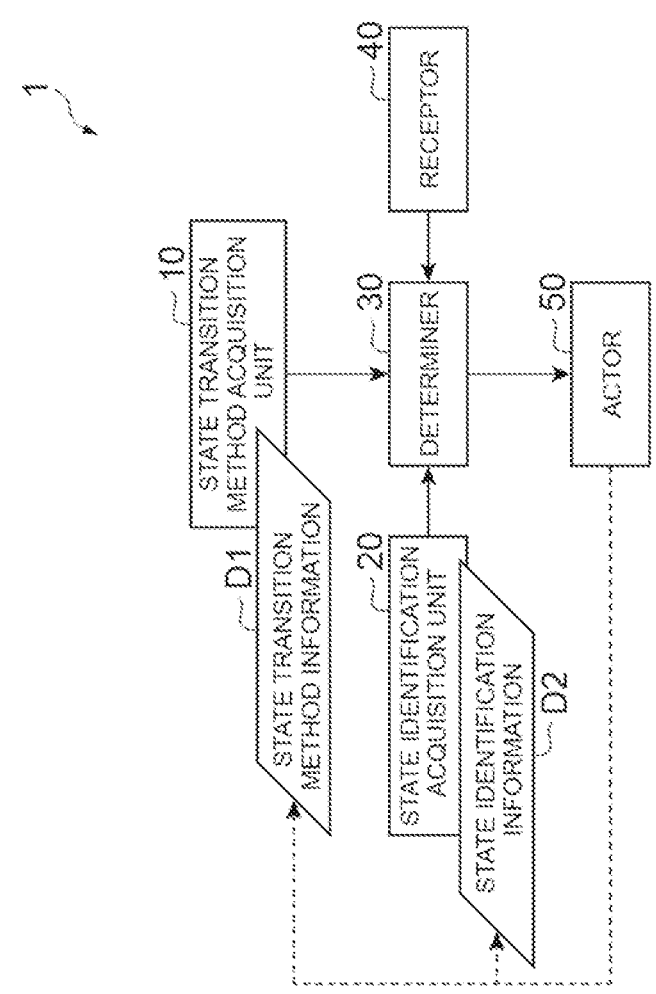
FIG. 10 illustrates an example of self-referencing operation.

FIG. 10 shows schematically how the state transition method information D1 and the state identification information D2 handled by the device are changed by self-referential actions. If the operation specified by the actor 50 is to update (e.g., add, change, delete, etc.) the state transition method information D1 and/or the State identification information D2, the state transition method information D1 and/or the state identification information D2 can be updated by activating or operating the actor 50 based on the judgment result by the determiner 30 (In FIG. 10, the case where the state transition method information D1 and the state identification information D2 are updated is shown). The fact that the state transition method information D1 and the state identification information D2 are updated means that the processing content by the processing apparatus 1 can be changed, and at least some of the functions of the processing apparatus 1 can be changed. In this way, the processing apparatus 1 can change its own functions or behavior, etc., even by self-referential actions.

Figure 11:
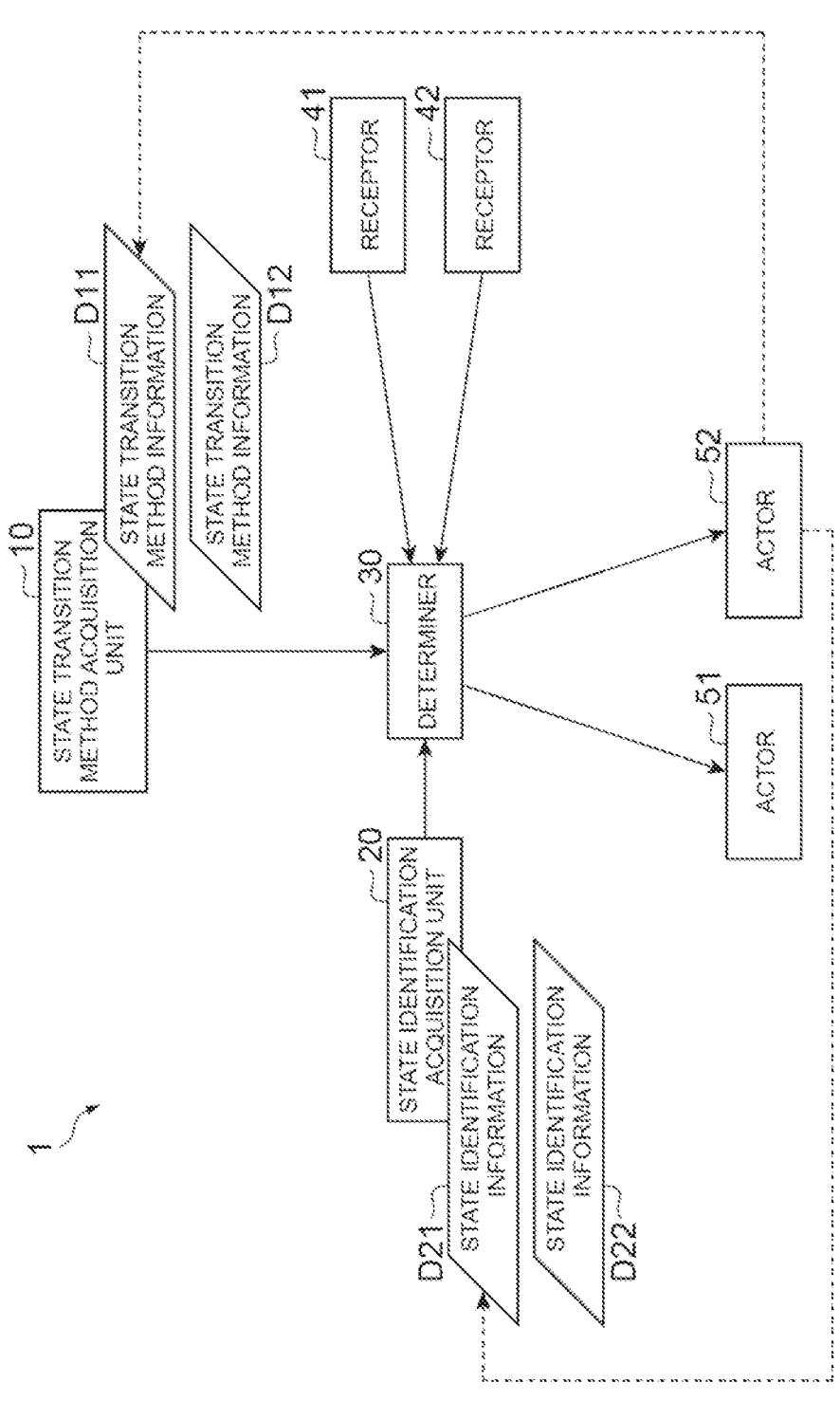
FIG. 11 illustrates an example of the self-referencing operation.

The above self-referencing operation can be applied to the configurations described in FIGS. 7 and 9. FIG. 11 schematically illustrates the state in which the self-referencing operation is performed in the configuration example shown in FIG. 7. FIG. 11 illustrates a configuration in which two types of judgments are made in the determiners 30 of one processing apparatus 1 as in FIG. 7. Here, the example shown in FIG. 11 illustrates the case where the action by the actor 52 specified by the state transition method information D12 and the state identification information D22 is to update the state transition method information D11 and/or the state identification information D21 (FIG. 11 shows the case where the state transition method information D11 and the state identification information D21 are updated). In this case, the state transition method information D11 and/or the state identification information D21 can be updated by activating or operating the actor 52 based on the judgment result by the determiner 30. The fact that the state transition method information D11 and/or the state identification information D21 is updated means that a part of the processing content by the processing apparatus 1 can be changed, and at least a part of the functions of the processing apparatus 1 can be changed.

Figure 12:
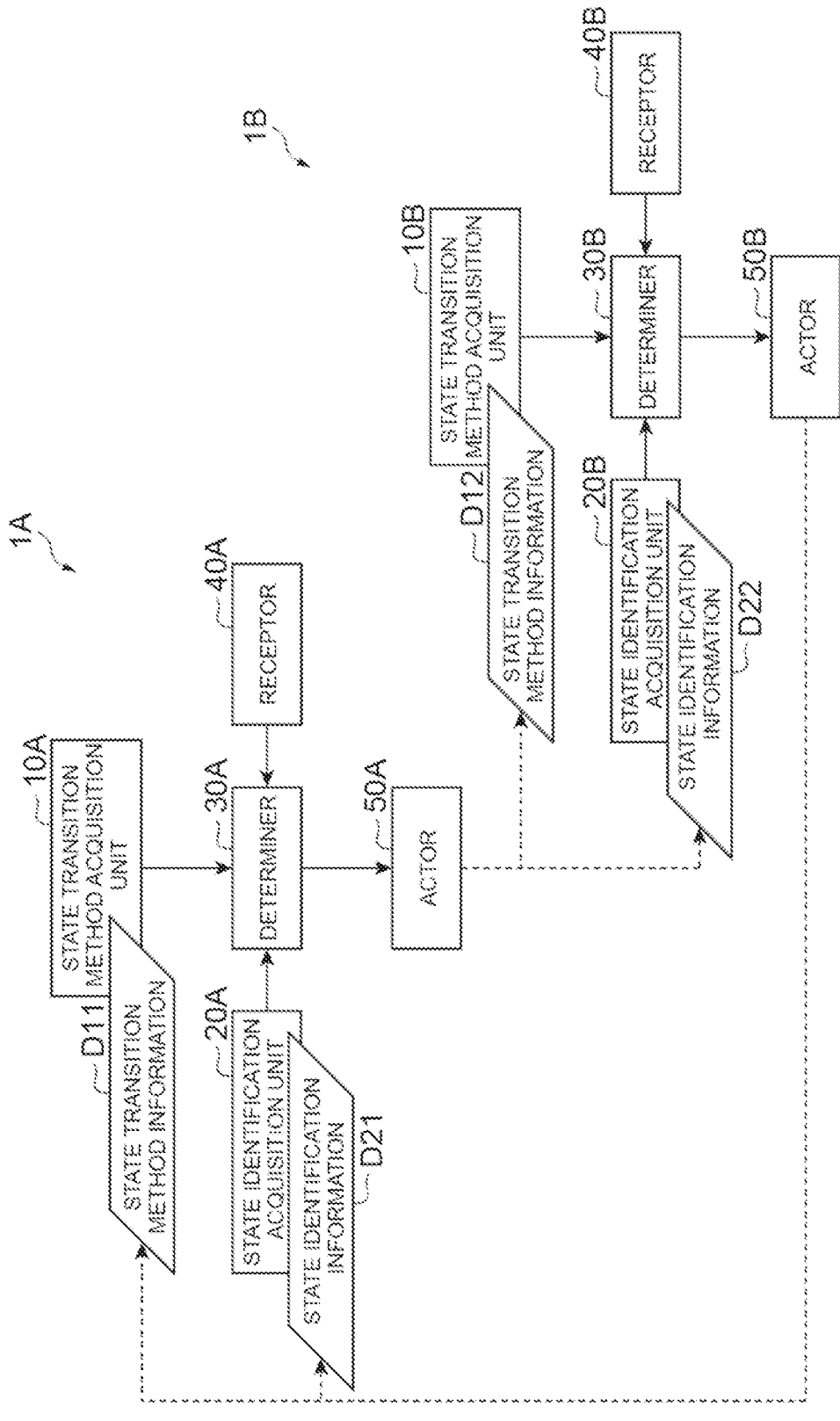
FIG. 12 illustrates an example of the self-referencing operation.

FIG. 12 also schematically shows the state in which the self-referencing operation is performed in the configuration example shown in FIG. 9. FIG. 12 illustrates the configuration in the case where the two processing apparatus 1A and 1B operate in cooperation, as in FIG. 9. In the example shown in FIG. 12, it is shown in the case of that the operation of the actor 50B specified by the state transition method information D12 and the state identification information D22, which specify the operation of the processing apparatus 1B, updates the state transition method information D11 and/or the state identification information D21 (FIG. 12 shows the case where the state transition method information D11 and the state identification information D21 are updated). In this case, the state transition method information D11 and/or the state identification information D21 can be updated by activating or operating the actor 50B based on the judgment result by the determiner 30B. The fact that the state transition method information D11 and the state identification information D21 are updated means that a part of the processing content by the processing apparatus 1A is changed and at least a part of the functions of processing apparatus 1A is changed. When a part of the functions of the processing apparatus 1A is changed, the state transition method information D12 and/or the state identification information D22 may be updated by the operation of the actor 50A. Then the processing apparatus 1B may also change some of its functions. In this way, in the processing apparatus 1A and 1B, the functions of their own devices can also be changed by self-referencing actions.

The self-referencing operation described in FIGS. 10 through 12 is an example and is not limited to this procedure. For example, the self-referencing operation may be configured to update only one of the state transition method information and the state identification information. It goes without saying that self-referencing operation is also possible even in a configuration in which the functions of the determiners 30 are dispersed and arranged, as in the processing apparatus 1X, although this explanation is omitted in this embodiment.

[Security (Safety) of Processing Apparatus]

The processing apparatus 1 described above is superior to conventional processing apparatus in terms of security (safety). In addition, by adding a security-enhancing configuration to the processing apparatus 1, it is possible to implement a processing apparatus with even higher security.

In the processing apparatus 1 described above, the only fixed element is the determiner 30, as described above. Therefore, it is possible to virtually eliminate potential bugs that could be inherent in conventional processing apparatus. In addition, since the processing apparatus 1 can be operated with "only the minimal information" necessary for state transitions, it prevents the entry of algorithms that can cause side effects. In addition, the concept of "user" is not necessary for the operation of the processing apparatus 1, and since account management, etc. is not performed, thus preventing the risk of account or password leaks, etc.

In addition, information specifying the operation in the processing apparatus 1, etc., exists in "fields" as described above. Therefore, the configuration for monitoring the operation of processing apparatus 1 can be easily and dynamically configured. In addition, the system configured with processing apparatus 1 can change functions while the system is operating as described above. Therefore, it is possible to prevent downtime in the security system.

Figure 13:
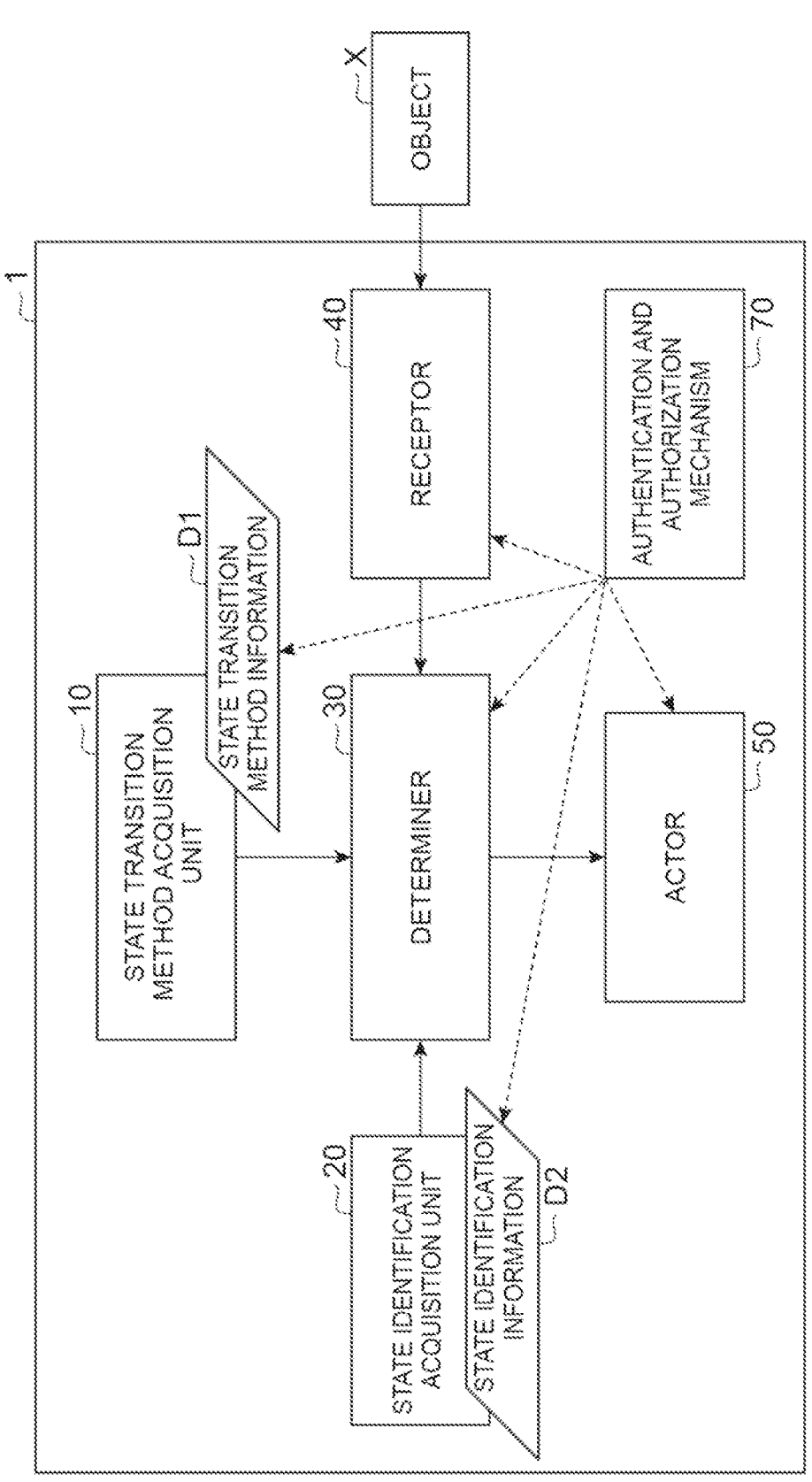
FIG. 13 illustrates an example of a combination of the processing apparatus and an authentication and authorization mechanism.

Next, with reference to FIG. 13, the case in which an authentication and authorization mechanism, etc., is combined with the processing apparatus 1 is explained. An authentication and authorization mechanism 70 refers to a functional unit that performs authentication processing that is currently in practical use or will be in practical use in the future to achieve security. Authentication processes include, but are not limited to, methods using serial numbers, passwords, public key cryptography, and combinations of these. By combining the authentication and authorization mechanism 70, which can perform these authentication processes, with the processing apparatus 1, it is possible to increase the security of the processing performed in the processing apparatus 1. In FIG. 13, the authentication and authorization mechanism 70 is shown as an example of being installed inside the processing apparatus 1, but the authentication and authorization mechanism 70 may, for example, be provided in the field, incorporated into the interior of the determiner 30, or incorporated into the receptor 40. Thus, the location and number of authentication and authorization mechanisms 70 can be changed as needed.

In addition, the targets for authentication and authorization by the authentication and authorization mechanism 70 include, but are not limited to, the determiner 30, the state transition method information D1, the state identification information D2, and the actor 50 as the acting entity of operation. By applying the authentication and authorization mechanism 70 to the processing apparatus 1, it may be possible to prevent inappropriate changes to the processing apparatus 1 from third parties other than developers, administrators, users, etc. The authentication and authorization mechanism may also perform authentication authorization of the profile accepted by the receptor. In this case, it may be possible to identify the target X, etc., and distinguish inappropriate state information, etc.

Another technique to increase the security of the processing apparatus 1 is, for example, to increase the fault tolerance and reliability of the processing apparatus 1. Techniques for increasing the fault tolerance and reliability of the processing apparatus 1 include redundancy and tandem operation. For example, the same receptor (e.g., the same file) is shared between different processing apparatus 1, and the output destination of the actors is set separately. Then, by comparing the output results from different processing apparatus 1, the reliability of the processing of the processing apparatus 1 can be checked. For tandem operation, for example, when a network receptor is used as a receptor, a representative processing apparatus 1 among multiple processing apparatus 1 is set, and the receptor of this processing apparatus 1, etc. The profile obtained is then distributed to the receptor(s) of the required processing apparatus(es) 1.

Another method to improve the security of processing apparatus 1 is to provide a separate processing apparatus that performs immune system operations, for example. As described above, the judgments made by the processing apparatus 1 can be flexibly set based on the state transition method information D1 and the state identification information D2. Therefore, it is possible to set up processing apparatus 1 that operates as an immune system and configure it to monitor and control the processing apparatus 1, etc., which is responsible for operation as a system (operation related to what the system originally wants to process). If the monitoring and control target is another processing apparatus 1, it is possible to check whether the state transition information, the state identification information, the determiners, and the actors are authenticated and authorized. In this way, by providing a separate processing apparatus 1 that performs state monitoring, etc., security as a system can be increased. The processing apparatus 1, etc. that operates as an immune system may be operated in multiple types according to the type and number of monitoring and control targets, or it may be operated in a hierarchical manner.

The methods listed above for increasing the security of the processing apparatus 1 or the system including the processing apparatus 1 may be combined as appropriate to further increase the security of the system including the processing apparatus 1. The perspective of security required to be improved in the system including the processing apparatus 1 may be changed according to the contents of processing in the system, the environment in which the system is used, etc. Therefore, the configuration for enhancing security may be changed as appropriate depending on the situation.

[Regarding Coordination when Operating More than One Processing Apparatus]

In addition to the configurations described above, multiple processing apparatus 1 may be operated in coordination. When the number of items (tasks) to be processed by processing apparatus 1 increases, it may be achieved that processing speed for tasks may be increased by adding a processing apparatus 1 having the same functions as the processing apparatus 1 to process the same type of task, or by dividing tasks and performing parallel or concurrent processing.

First, the procedure for adding a processing apparatus 1' that has the same or similar functions as the processing apparatus 1 is described. First, the state transition method information Dr and the state identification information D2' to be used in the additional processing apparatus 1' is prepared. Specifically, duplicates are prepared for each of the state transition method information D1 and the state identification information D2 used in the processing apparatus 1. In addition, if the functionality is to be different from that of the processing apparatus 1, the state transition method information D1' and the state identification information D2' may be prepared by modifying (including addition and deletion) at least one of the state transition method information D1 and the state identification information D2. As described in detail below, it is also possible to share the state transition method information D1 and/or the state identification information D2 among multiple processing apparatus. Therefore, it is possible to prepare at least one of the state transition method information D1 and the state identification information D2 for a new processing apparatus 1'. It is also possible to share the state transition method information D1 and the state identification information D2.

Next, the determiners 30 to be used in the processing apparatus 1' to be added are specified. Since the determiners 30 differ from each other for each processing apparatus 1, the determiners 30' that correspond to the added processing apparatus 1' are specified. By performing the above procedure, the determiners 30' to be added, the state transition method information D1' and the state identification information D2' used in the judgment processing in the determiners 30' are specified, so that the new processing apparatus 1' becomes operable. The preparation of the state transition method information D1' and the state identification information D2' and the specification of the determiner 30' can be operated any order.

The occasion for starting the above procedure for adding a processing apparatus 1' may be specified by, for example, a person or a device (machine, circuit, program, etc.). In this case, the above procedure may be started by an instruction to a computer or the like to perform the processing necessary for adding the processing apparatus 1' by the person, device, etc. described above. In addition, the state transition method information D1 and the state identification information D2 used in the determiner 30 in the processing apparatus 1 may specify the start of the process. As an example of such a configuration, in the state transition method information D1 and the state identification information D2 used in the determiner 30, it may be stipulated to start or operate the actor that adds the processing apparatus 1' according to the result of the judgment in the determiner 30.

Next, a configuration in which some functional units are shared by multiple processing apparatus 1 is described. As described above, each of the processing apparatus 1 performs a judgment operation by the determiner 30 based on the state transition method information D1 and the state identification information D2, respectively. The state transition method information D1 and the state identification information D2 used in this case need not be individually specified for each processing apparatus 1 (the determiner 30). Therefore, it is possible to share some functions other than the determiners 30.

Figure 14:
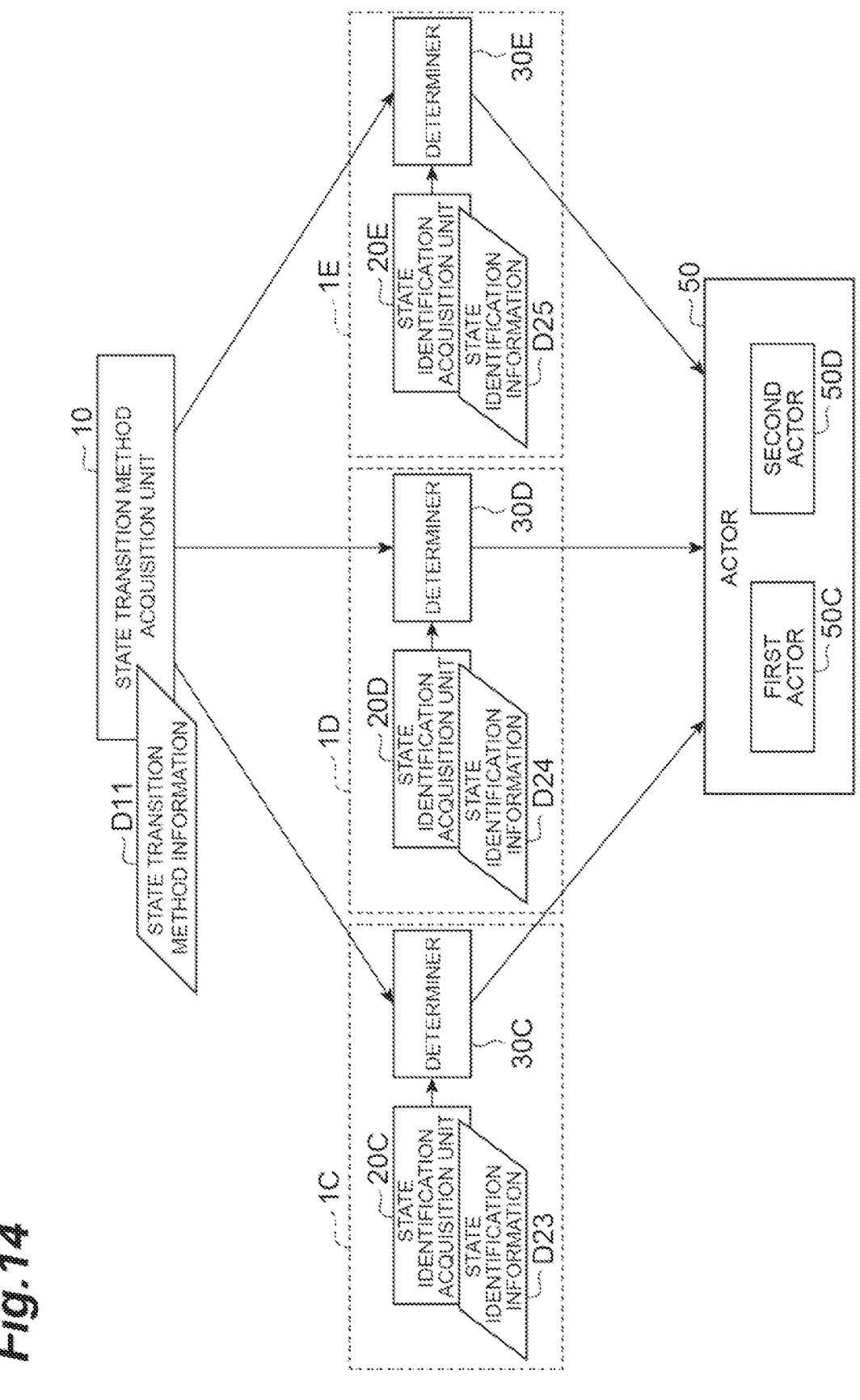
FIG. 14 illustrates an example of operation by multiple processing apparatus.

Specific configuration examples are described with reference to FIGS. 14 and 15. FIG. 14 shows a configuration in which three processing apparatus 1C to 1E use the common state transition method information D11. The processing apparatus 1C to 1E retain, respectively, the determiners 30C to 30E, the state identification acquisition units 20C to 20E, and the state identification information D23, D24, and D25. On the other hand, the processing apparatus 1C to 1E share the state transition method acquisition unit 10, and the state transition method information D11 are specified in the processing apparatus 1C to 1E, individually. With this configuration, in the determiner 30C of the processing apparatus 1C, the judgment is made based on the state transition method information D11 and the state identification information D23. The judgment is made based on the state transition method information D11 and the state identification information D24 in the determiner 30D of the processing apparatus 1D. The judgment is made based on the state transition method information D11 and the state identification information D25 in the determiner 30E of the processing apparatus 1E. In addition, the processing apparatus 1C to 1E may share multiple state transition method information D11 acquired in the state transition method acquisition unit 10.

When the state transition method information D11 is shared among the processing apparatus 1C to 1E, the shared state transition method information D11 includes information that can be used by any of the three processing apparatus 1C to 1E. In this case, the state transition method information D11 may include information that is not used by some processing apparatus.

As shown in FIG. 14, when the state transition method information is shared or the state identification information is shared, the determiners 30C through 30E at each processing apparatus, a common actor 50 may be activated or operated as a result of the judgment by the determiners, respectively. As an example, as shown in FIG. 14, as a result of the judgment by the determiners 30C to 30E, at least one of the two types of the actors, a first actor 50C and a second actor 50D may be activated or operated. When the state transition method or the state identification method is shared, the same operation (operation by the actor) may be specified as a result of the judgment. In such a case, the actor 50 may be shared, as shown in FIG. 14. Even if both the state transition information and the state identification method information are not shared, the actor 50 may be shared in multiple processing apparatus 1 as a result of the judgment. Frequently used actors may also be shared as a library in multiple processing apparatus 1.

Figure 15:
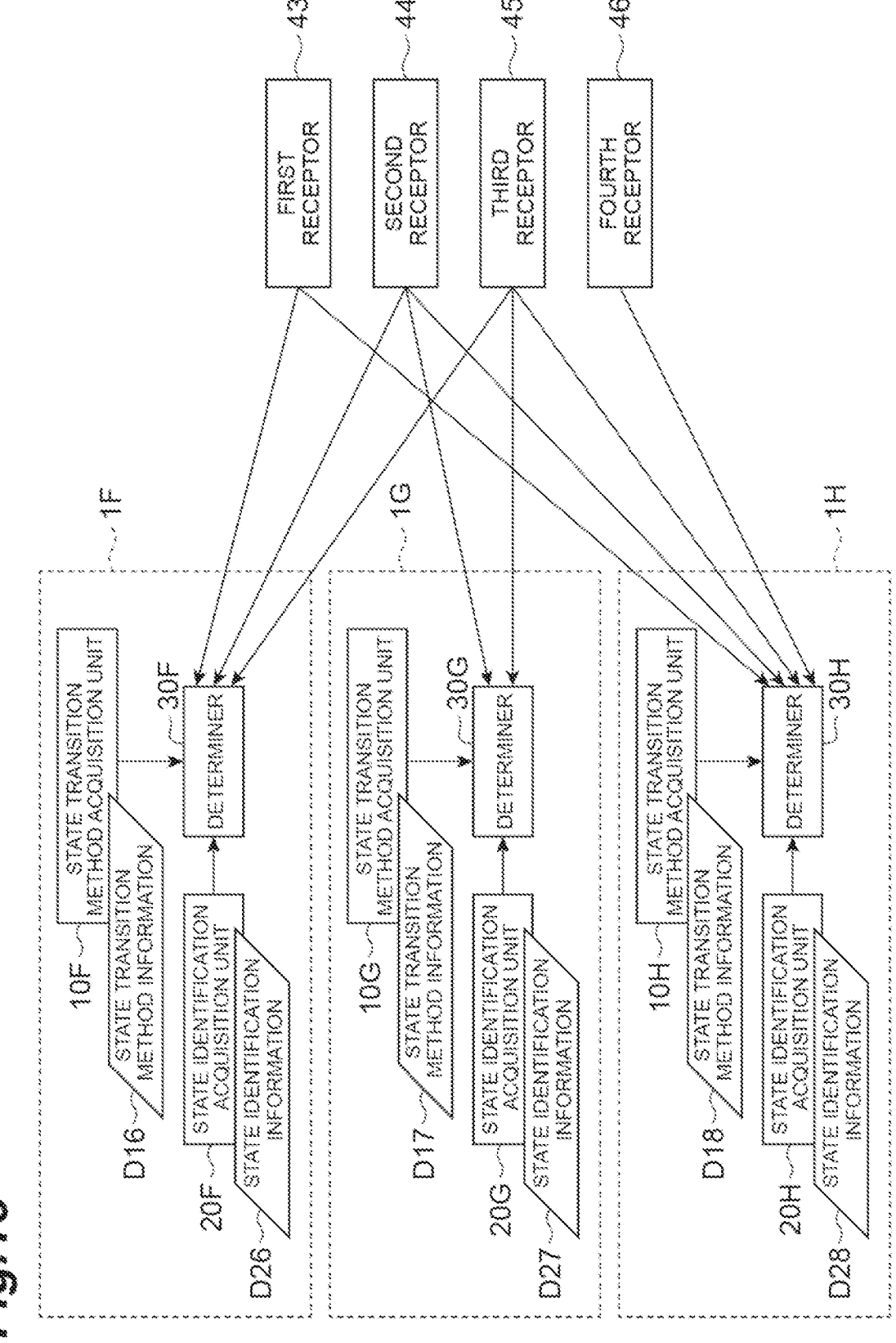
FIG. 15 illustrates an example of operation by multiple processing apparatus.

In FIG. 15, common receptors are used in three processing apparatus 1F to 1H as multiple processing apparatus. The processing apparatus 1F to 1H individually retain, respectively, determiners 30F to 30H, state transition method acquisition unit 10F to 10H, state identification acquisition units 20F to 20H, state transition method information D16, D17, D18, and state identification information D26, D27, and D28. If the state transition method information D16 to D18 and the state identification information D26 to D28 specify the use of the same receptor, the processing apparatus 1F to 1H may be configured to share the same receptor. In the example shown in FIG. 15, a first receptor 43 to a fourth receptor 46 are shown as four receptors. In the example shown in FIG. 15, the first receptor 43 is shared by the processing apparatus 1F, 1H, and the second receptor 44 and the third receptor 45 are shared by processing apparatus 1F to 1H. In addition, the fourth receptor 46 is used only by the processing apparatus 1H. Thus, multiple processing apparatus may be configured to share the receptors.

The state transition method acquisition units 10F to 10H shown in FIG. 15 and the state transition method information D16, D17, and D18 may be shared by multiple processing apparatus 1 as in the example shown in FIG. 14.

In the example shown in FIG. 15, for example, the first receptor 43 converts the information acquired from the target X (not shown) into state information (rL, P) as necessary and provides it to the determiner 30F of the processing apparatus 1F. At this time, if it is specified that the judgments are made on the state information acquired by the first receptor 43 in the processing apparatus 1F and 1H, the state Information acquired by the first receptor 43 may be alternately sent to the processing apparatus 1F and 1H.

As another form, one receptor may be configured to provide the state information generated from the acquired information to (the determiners of) multiple processing apparatus that are linked to each other. In this case, judgments based on the same state information can be made in determiners of multiple processing apparatus. In this way, when the receptor is shared by multiple processing apparatus, how to handle the information acquired at the receptor may be specified in advance. The operations described above can also be realized in a configuration where multiple receptors are shared by multiple processing apparatus, as shown in FIG. 15, for example. The various methods of sharing functional units described above may be combined as appropriate to operate the plurality of processing apparatus 1.

[About the Transaction Processing of the Processing Apparatus]

Figure 16:
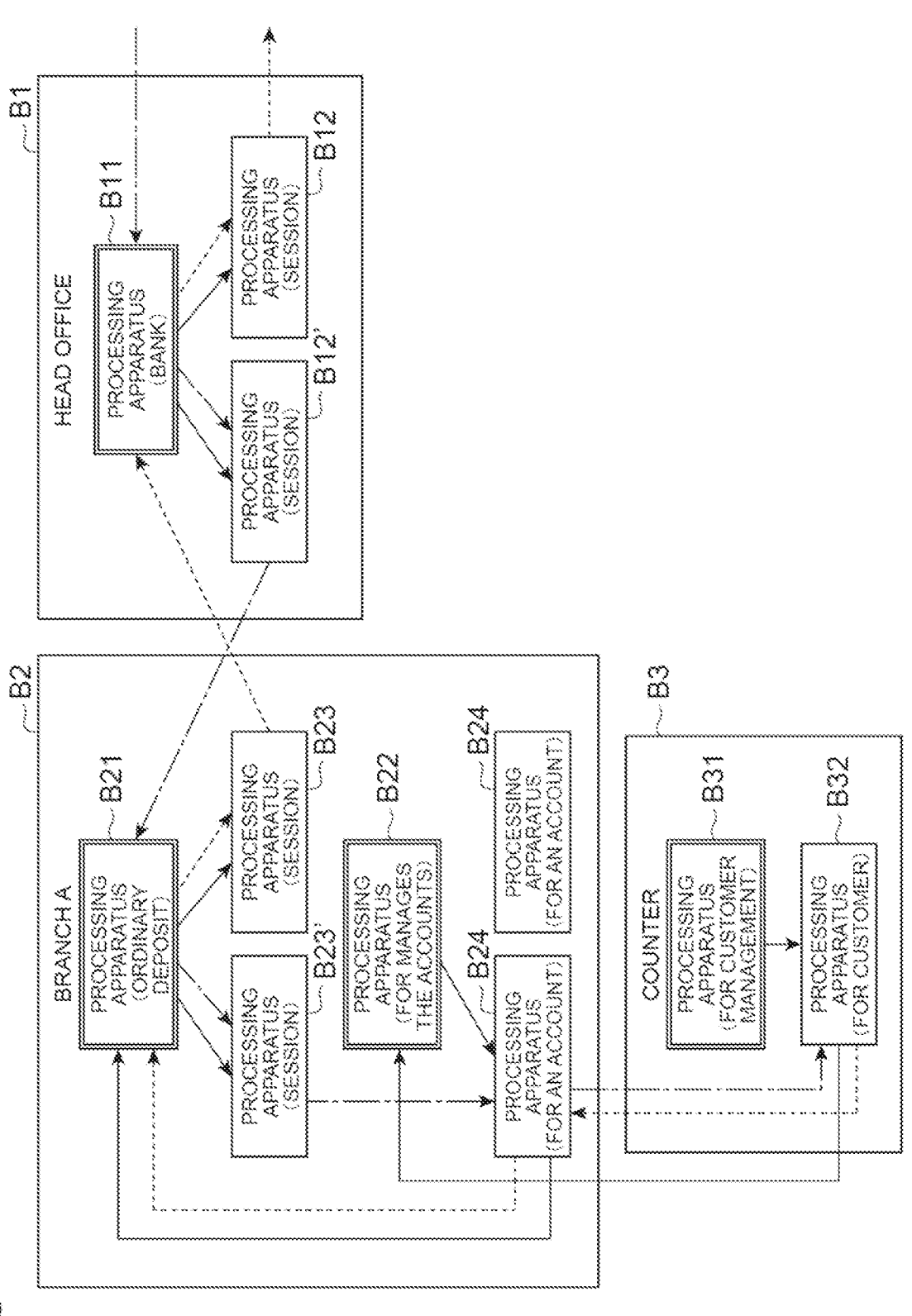
FIG. 16 illustrates an example of a system for transaction processing.

By configuring a system with multiple processing apparatus 1, a system for transaction processing can also be implemented. FIG. 16 illustrates an example of a configuration of the processing apparatus to implement bank remittance processing as an example of transaction processing.

FIG. 16 shows an example of the configuration of processing apparatus in a remittance management system for one bank. The system shown in FIG. 16 can be configured to include a head office function B1, a branch function B2, and a counter function B3. The head office function B1 can be the part with functions related to interbank and interbranch transactions. The branch function B2 can be the part with functions related to transactions of products, etc. managed by each branch. The branch function B2 can be multiple according to the number of branches. The counter function B3 can be a portion having a function as a counter for customers to perform transactions, for example, an ATM, an Internet banking operation screen, or a bank counter. In FIG. 16, the solid line shows an example of the control (startup, termination, etc.) relationship between processing apparatus. The dashed line indicates transmission (to another bank), and the single-dotted line indicates an example of the path of information received (from another bank).

The head office function B1 can include a processing apparatus (bank) B11 and a processing apparatus (session) B12. The processing apparatus B11 can be a processing apparatus that, for example, processes all inter-branch and inter-bank transactions or manages transactions, etc. Also, the processing apparatus B12 can be a processing apparatus that is activated or operated only when a transaction such as a remittance occurs, similar to a processing apparatus (session) B23 provided in branch function B2 described below.

The branch function B2 includes a processing apparatus (for products, e.g., savings or time deposits) B21, a processing apparatus (for account management) B22, a processing apparatus (for sessions) B23, and a processing apparatus (for accounts) B24. The processing apparatus B21 can be a processing apparatus that manages each of the bank's products, processes all of those transactions, or manages transactions, etc. The processing apparatus B22 can be a processing apparatus that manages the accounts under its jurisdiction. The processing apparatus B24 can be a processing apparatus that can be activated and operated on an account-by-account basis, and can manage all account transactions, such as deposits and withdrawals as well as passbooks. This processing apparatus B24 can be activated and terminated from a processing apparatus (for customers) B32 described below, which is included in the counter function B3. Although two processing apparatus B24 are shown as an example, they can be activated for each account.

The counter function B3 can include a processing apparatus (for customer management) B31 and a processing apparatus (for customers) B32. The processing apparatus B31 can, for example, manage customer IDs. The processing apparatus B31 can manage, for example, startup and termination of the processing apparatus B32 corresponding to the customer ID. The processing apparatus B32 can also function as a counter for financial transactions by customers. The processing apparatus B32 can, for example, manage the customer's personal information and account number. The processing apparatus B32 can request the processing apparatus (for account management) B22 to open or close an account. The processing apparatus B32 can also start and stop the processing apparatus B24 and other devices associated with the account as necessary when the customer performs a transaction.

Of the group of processing apparatus shown in FIG. 16, the processing apparatus B11, B21, B22, and B31 can be activated and operated at any time. In addition, the processing apparatus B24 can be activated on an account-by-account basis when a transaction for a specific account is conducted. Also, the processing apparatus B32 can be activated for each customer when the customer starts a transaction. The processing apparatus B12 and B23 pertaining to a session can be activated when conducting a session pertaining to a transaction.

The processing apparatus B12 and B23 for the session can be generated as a characteristic feature for transaction processing, for each single transaction, on each of the necessary paths for transaction communication. The processing apparatus B12, B23 can be processing apparatus that handle the substantive processing and transmission of information, etc. In addition, in the case of that information is sent and received (session) via the processing apparatus B12, B23, when the processing apparatus B12, B23 are started, for example, a key can be generated to identify the destination of sending/receiving information or to hide the communication path, and the process can be shared by the sending/receiving side. The processing apparatus B12 can be started and terminated by the processing apparatus B11. The processing apparatus B23 can be started and terminated by the processing apparatus B21. As an example, the processing apparatus B11 and B21, which can be in charge of starting and terminating the processing apparatus B12 and B23 for a session, can be configured to control the generation of keys for the session as well as the startup and shutdown of the processing apparatus for the session. Furthermore, the processing apparatus B11, B21 can be configured to receive the information to be sent by the processing apparatus pertaining to the session (e.g., the processing apparatus B12, B23), for example, can be configured to provide instructions for transmitting the information that has been transferred or processed.

The following is an example of the operation of each processing apparatus when the above system is used to process money transfers. Here, we consider a customer operating, for example, one account to transfer money to an account at another bank. In this case, the customer's operation of the ATM interface, for example, is detected, and the processing apparatus B31 activates processing apparatus B32. Based on the customer's operation of the interface, the processing apparatus B32 activates the processing apparatus B24 which corresponds to the account from which the money is transferred. At that time, the above operation may be performed via the processing apparatus B22. In addition, based on the customer's operation, by these processing apparatus B32 and B24 are operated, the processing apparatus B21 is instructed to set up a session (the processing apparatus B23 corresponding to the session) for the remittance, and the processing apparatus B23 is activated. As a result, a session is set up between the branch function B2 and the head office function B1, and information pertaining to the remittance can be transmitted to the head office function B1. Based on the information transmitted by the processing apparatus B23, head office function B1 activates, if necessary, the processing apparatus B12 corresponding to a session with the other bank. A session is set up with the other bank by the processing apparatus B12 and information pertaining to interbank transfers is sent and received. On the other bank's side, the operation of adding the remittance amount to the receiving bank's account can be performed using a group of processing apparatus similar to those described above. In the case of remittance processing within the same bank or branch, a session between the head office function B1 and the branch function B2 may be performed without establishing a session between them.

In the above system, when information is transmitted using a session, e.g., two-phase commit, the processing apparatus B12 and B23 are terminated. The keys used in the session will also be discarded, thus preventing the same session from being repeated.

While the above describes an example of processing pertaining to remittance using the system, responding to transfers from external banks, etc. to a specific account can be achieved by performing the opposite operation to the above. For example, when a process pertaining to a transfer is performed at another bank, a processing apparatus B12' corresponding to the session with the other bank is activated in response to a request from the other bank. A session is set up with the other bank by the processing apparatus B12', and information pertaining to the transfer is sent and received between the banks. Next, the processing apparatus B12' sends instruction to the processing apparatus B21 that set up the session (a processing apparatus B23' corresponding to the session) pertaining to the receipt of the remittance, and the processing apparatus B23' is activated. As a result, a session is set up between the branch function B2 and the head office function B1, and information pertaining to the receipt of the remittance can be sent from the head office function B1 to the branch function B2. Furthermore, the processing apparatus B23' activates the processing apparatus B24 corresponding to the account that is to receive the remittance. At that time, the above operation may be performed via the processing apparatus B22. In addition, when the customer's operation of the ATM or net banking interface is detected, for example, the processing apparatus B31 activates the processing apparatus B32. When the customer operates the interface, the processing apparatus B32 updates the information received by the processing apparatus B24 pertaining to the receipt of the remittance. Then the information is presented to the customer in an updated state. As a result, the customer can grasp the amount of money transferred and its details, etc. The above process is an example, and the arrangement of the processing apparatus is not limited to the configuration example described above.

In the above system, transaction processing is performed by using the processing apparatus B12 and B23 corresponding to the session. can be realized. In transaction processing, for example, the processing must have "atomicity", "consistency", "isolation", and "durability".

Atomicity is the property that ensures that all or none of the tasks involved in an operation will be performed. For example, in the case of transferring 10,000 yen from an account A to an account B, there are two operations: "subtract 10,000 yen from the balance in the account A" and "add 10,000 yen to the balance in the account B". Ensured atomicity means that all of the above two operations are performed or none of them are performed.

In addition, consistency and integrity is the property that ensures that a pre-defined consistency is met at the beginning and end of an operation. For example, when transferring money from the account A, it refers to ensuring that no amount can be transferred that would cause A's account balance to be negative before and after the transfer. Isolation means that the process of an operation is invisible to other operations. For example, in the example of a transfer between accounts, there is an internal state in which "money is deducted from the account A, but not added to the account B", but only the state before and after the transfer can be confirmed from the outside.

Durability means that once the user receives notification of the completion of an operation, the operation becomes persistent and the result is not lost.

In the above system, when a single transaction is operated, each transaction has its own session, thus ensuring isolation can be ensured. In addition, because the system is configured to establish individual sessions between each function to communicate information, it is possible to ensure the consistency of each session. Furthermore, for example, a session chain can be formed by associating multiple sessions whose consistency is ensured, and communication (e.g., 2-phase commit) can be performed through the chain to ensure consistency and integrity.

Furthermore, the above system can destroy a session when it is confirmed that the specified process has been completed in each session, and can also cancel a transaction in the event of unforeseen circumstances, thus atomicity can be ensured. The above system can ensure durability because the same session is prevented from being repeated unintentionally. Thus, the above system can achieve the performance required for transaction processing. Thus, the system composed of a combination of the processing apparatus 1 can be applied to transaction processing. In addition, to ensure consistency, integrity, and atomicity, for example, a processing apparatus or the like may be added to the system to confirm that information has been properly sent and received in each session.

[About the Workflow]

For example, in the state transition method information D1, etc., the conditions for executing a job subject to workflow control (e.g., start, interruption, error state, termination, re-execution, etc.) are specified in the first section D91, etc., and the operation method for executing the job (e.g., start, interruption, error avoidance, re-execution, termination, next job start, etc.) is specified in the second section D92, etc., and by associating these processes with the number of jobs subject to workflow control, for example, so-called workflow processing can be performed.

[About Artificial Intelligence]

Algorithmic processing included in so-called artificial intelligence can be changed or updated without stopping the processing operation by using the processing apparatus 1. In so-called neural networks, for example, the functions and operations of neurons can be specified by the operation identification information D0, and the processing apparatus 1 can be activated, operated, terminated, or deleted as a new neuron, or the operation of specific neurons including itself can be changed. In addition, coupling between neurons can be realized, for example, by combining the receptor(s) 40 and the actor(s) 50 as appropriate. In addition, since the processing apparatus 1 can make the receptor 40 and the actor 50 variable elements, so that the combinations among neurons, including their functions and topology, can be changed without stopping the operation of the processing apparatus 1. In this way, the function, capability, capacity, etc. of the artificial intelligence in operation can be changed by changing or modifying the algorithm that preprocesses the learning data in the artificial intelligence or the neural network that performs machine learning without stopping the operation of the artificial intelligence. Also, by configuring the neural network, etc. with the Processing apparatus 1, the results of the operation of the artificial intelligence (e.g., learning results) can be stored in the operation identification information D0. Also, by dividing the operation identification information D0 of the processing apparatus 1 that constitutes the neural network, for example, according to the level of abstraction as described above, analysis such as visualization, interpretation, understanding and application of the operation results of the artificial intelligence is possible to do.

[Other Applications]

The Processing apparatus 1 can specify substantial processing such as BRMS (Business Rule Management System (BRMS) and RPA (Robotic Process Automation) with the operation identification information D0. In addition, the processing apparatus 1 can eliminate the need to generate devices and programs that substantially process functions in BRMS and RPA.

The processing apparatus 1 can be modified by adding, changing, or deleting only the necessary parts of the processing apparatus 1, thereby eliminating the need for so-called software version management, for example. In addition, for example, when observing, controlling, or simulating an uncertain object such as an ecosystem whose components (e.g., organisms, climate, etc.) change according to circumstances (including, for example, cases in which an organism moves or becomes extinct and is no longer a component of the ecosystem, or moves from another place and becomes a new component of the ecosystem), the processing apparatus 1 can perform substantial processing without stopping its operation. In this case, the processing apparatus 1 can function as an engine for substantial coupled calculations. As an ecosystem, a situation in which multiple cloud computing systems, for example, are linked together can be considered.

<Detailed Description of the Processing Apparatus, Including its Specific Operation>

The description of the functional units pertaining to the processing apparatus 1 above includes many conceptual parts. For this reason, the following description assumes that the processing apparatus 1 is used to control the operation of an air conditioner. In an air conditioner, the room temperature and other factors are measured by sensors, and based on the results, each part of the air conditioner is operated so that the room temperature is within a predetermined range (set temperature). In such a case, we will further explain the configuration of the processing apparatus 1 while explaining how each functional unit of the processing apparatus 1 operates. Naturally, the processing target of the processing apparatus 1 is not limited to air conditioners.

[About the Field]

The following is a further explanation of the field to be handled by processing apparatus 1. The field can be a state of reality in the real world, as described above. The state of the field can be described using label(s) and profile(s). For example, the temperature (rL: temperature, P: *° C.) and humidity (rL: humidity, P: *%) of the room to be adjusted by the air conditioner, the temperature of the outdoor air where the outdoor unit is installed (rL: outdoor air temperature, P: *° C.), etc. can be handled as field states, when considering the control of the operation of an air conditioner by the processing apparatus 1.

The state transition method acquisition unit 10, the state identification acquisition unit 20, the receptor 40, and the actor 50 can also be provided in this field. It can also be said that the information handled by each of these parts will also be present in the field. Therefore, these states could also be described using the labels and the profiles. For example, the state transition method acquisition unit 10 (rL: the state transition method acquisition unit, P: the state transition method acquisition unit in the processing apparatus 1), the state transition method information D1 (rL: the state transition method information, P: the state transition method information used in the processing apparatus 1).

[Type of Element in the Processing Apparatus]

This section describes the types of elements of each functional unit of the processing apparatus 1. In this embodiment, it is assumed that each functional unit that performs the desired processing (the program to realize that function) can belong to either a fixed element or a variable element. The information handled by the processing apparatus 1 can also be distinguished into fixed or variable elements.

The fixed elements can be defined as those whose behavior must be changed if the content of the element is changed. For example, a conventionally used program is the fixed element. For example, consider adding a new part that detects the outside temperature and controls based on the result to the default program that controls the operation of an air conditioner. In such a case, it is necessary to modify the program to add a description of control based on the outdoor temperature, stop processing based on the pre-modified program incorporated in the air conditioner, replace it with the modified program, and then start processing based on the modified program. Thus, when there is a modification to the program, an element that requires the program operation to be stopped once when the modification is reflected may be referred to as a fixed element in this embodiment.

The variable element, on the other hand, can be defined as a variable element that can be changed without stopping its operation, even when the content of a variable element that is operating is changed. For example, the field state (rL, P) can be arbitrarily handled and thus can be said to be a variable element. For example, the state transition method acquisition unit 10, the state identification acquisition unit 20, the receptor 40, and the actor 50 can each be described as the state of the field, so they can be said to be the variable elements. In addition, the profile (P) included in the state (rL, P) may be said to be the variable element because it can change.

Of the various parts of the processing apparatus 1, the determiner 30 can be considered to be the fixed element. As mentioned above, most of the processing apparatus 1 can be treated as variable elements, but the determiners 30 can be fixed elements. In the processing apparatus 1, the ratio of fixed elements among the components of the device is kept as small as possible, so that the processing does not stop even when the processing content is changed. It is considered necessary to stop the operation of the processing apparatus 1 when the determiners 30 themselves are changed. However, in the processing apparatus 1, the determiner 30 only performs a comparison between the state identification information D2 and the state of the field acquired by the receptor 40, then based on the result, to activate or operate the actor 50 specified in the state transition method information D1 and/or the state identification information D2. Thus, since the determiners 30 only specify that judgments are made and processing is executed based on the results of the judgments, the structure is such that the problem of changing the determiners 30 itself is unlikely to occur. This point differs from the conventional program used for air conditioner control.

[Differences Between Control Based on Conventional Program and Control by a Processing Apparatus]

Next, the case of temperature control by an air conditioner is explained by comparing control using a conventional program with control by the processing apparatus described in this embodiment.

First, the following describes a case in which the temperature and humidity of an indoor space are detected by an air conditioner and the operation of the air conditioner is adjusted based on the results. Table 1 shows the control using the conventional program as a table. The term "being in the field" may be taken as being outside of the program or outside of the determiner.

TABLE 1

| step | Set of the state (Label, Profile) before input | Operation of algorithm or logic | Set of the state (Label, Profile) after operation |
|---|---|---|---|
| 1 | (rL: temperature, P: *° C.) in the Field | Generate a profile (hot, good, cold) | (pL: pseudo-intermediate state (temperature gap), P: (hot, good, cold)) in the program |

TABLE 1-continued

| step | Set of the state (Label, Profile) before input | Operation of algorithm or logic | Set of the state (Label, Profile) after operation |
|---|---|---|---|
| 2 | (rL: humidity, P: *%) in the Field | Generate a profile (steamy, good, dry) | (pL: pseudo-intermediate state (humidity gap), P: (steamy, good, dry)) in the program |
| 3 | (pL: pseudo-intermediate state (temperature gap), P: (hot, good, cold)) in the program | Generate a profile (Pw watt) based on the pseudo-intermediate states (temperature gap), (humidity gap), and the motor control map | (pL: pseudo-intermediate state (motor power), P: (Pw watt)) in the program |
| 4 | (pL: pseudo-intermediate state (humidity gap), P: (steamy, good, dry)) in the program | Generate a profile (Pw watt) based on the pseudo-intermediate states (temperature gap), (humidity gap), and the motor control map | (pL: pseudo-intermediate state (motor power), P: (Pw watt)) in the program |
| 5 | (pL: pseudo-intermediate state (motor power), P: (Pw watt)) in the program | Provide power (Pw watt) to the motor | (rL: temperature, P: T° C.) and (rL: humidity, P: H %) in the field |

In Table 1, each process specified by the conventional program is shown as a step, and the state before input, the operation specified by the algorithmic logic, and the state after the operation in each step are shown. For example, in step 1, information on the state (rL: temperature, P: *° C.) existing in the field is acquired, a profile (hot, good, cold) is generated from the difference between the acquired temperature and the set temperature, then the state after operation (pL: pseudo-intermediate state (temperature gap), P: (hot, just right, or cold)) is generated and output. This post-operating state is used as the pre-input state in step 3. Thus, in the conventional program, the pseudo-intermediate state pertaining to temperature (here, hot, good, or cold) and the pseudo-intermediate state pertaining to humidity (here, steaming, good, or dry) are generated from the temperature and humidity in steps 1 and 2. Also, in steps 3 and 4, from these two pseudo-intermediate states, a pseudo-intermediate state pertaining to motor power (Pw watt) is generated. Then, in step 5, the motor power based on the pseudo-intermediate state pertaining to the motor power (Pw watt) is returned to the motor in the field to operate the motor. Thus, in the conventional program, the pseudo-intermediate state is generated in the program and connected to the processing in the later steps.

The intermediate state indicates an intermediate state until the control to operate the air conditioner is executed based on the temperature and humidity information of the air conditioner, and parameters used to specify the operation of the air conditioner such as temperature gap and humidity gap can be defined as intermediate states. In addition, a pseudo-intermediate state is an intermediate state for convenience that exists within the program area, not pertaining to a field state. Specifically, the pseudo-intermediate state is defined in the program as an intermediate state necessary for the processing of the program. The pL in the pseudo-intermediate state is a label for convenience in the pseudo-state and may be considered equivalent to the label (rL) in the field state. A variable name or register name can also be used as pL. The pseudo-intermediate state exists in the program area, etc., and unless the program is changed, the label pL for convenience described above cannot be changed in effect. Therefore, the pseudo-intermediate state in a conventional program may also be a fixed element. However, the profile (P) may also be a variable element in the pseudo-states (pL, P) such as pseudo-intermediate states. Since the profile (P) is the part of the program that corresponds to a variable, it can be said to be variable and can be treated as a variable element. In order to reflect the pseudo-state that exists in the program area, such as a pseudo-intermediate state, into the field, some operation is necessary, for example, writing to a file, sending to a network, writing to a database, or moving a device.

Next, we will explain the operation of the same process as above with reference to Table 2 for the case where the same process is performed with this embodiment of the processing apparatus 1.

TABLE 2

| step | Set of the state (Label, Profile) received at Receptor | Operation of Determiner | Operation in Actor | Set of the state (Label, Profile) affected by Actor |
|---|---|---|---|---|
| 1 | (rL: temperature, P: *° C.) in the field | Compare with the set temperature, then activate an actor | Generate a profile (hot, good, cold) from difference between the temperature and the set temperature | (rL: intermediate state (temperature gap), P: (hot, good, cold)) in the field |
| 2 | (rL: humidity, P: *%) in the field | Compare with the set humidity, then activate an actor | Generate a profile (steamy, good, dry) from difference between the humidity and the set humidity | (rL: intermediate state (humidity gap), P: (steamy, good, dry)) in the field |

TABLE 2-continued

| step | Set of the state (Label, Profile) received at Receptor | Operation of Determiner | Operation in Actor | Set of the state (Label, Profile) affected by Actor |
|---|---|---|---|---|
| 3 | (rL: intermediate state (temperature gap), P: (hot, good, cold)) in the field | Compare with the desired state, then activate an actor if the state is not the desired state | Generate a profile (Pw watt) based on the intermediate states (temperature gap), (humidity gap), and the motor control map | (rL: intermediate state (motor power), P: (Pw watt)) in the field |
| 4 | (rL: intermediate state (humidity gap), P: (steamy, good, dry)) in the field | Compare with the desired state, then activate an actor if the state is not the desired state | Generate a profile (Pw watt) based on the intermediate states (temperature gap), (humidity gap), and the motor control map | (rL: intermediate state (motor power), P: (Pw watt)) in the field |
| 5 | (rL: intermediate state (motor power), P: (Pw watt)) in the field | Compare with the any state of motor power that is possible (e.g., '*'), then activate an actor (unconditionally) | Provide power (Pw watt) to the motor | (rL: temperature, P: T° C.) and (rL: humidity, P: H %) in the field |

The steps 1 to 5 shown in Table 2 correspond to the steps 1 to 5 in Table 1, respectively. In Table 2, corresponding to the process by processing apparatus 1, shows the set of states (labels, profiles) received at the receptor 40 (e.g., the information of the state provided to the determiners 30), the operation of the determiner 30, the internal operation of the actor 50 (actions performed by the actor 50) based on the judgment result of the determiner 30, and the set of states (labels, profiles) on which the actor 50 acts.

As shown in Table 2, each process performed by the processing apparatus 1 is basically similar to a conventional program. However, the intermediate state output as a result of performing each step is different from the pseudo-state that exists only inside the program, as it points to a state that exists in a field, such as a file or database, for example, although it is a parameter used during processing. The state that exists in a field may also be a variable element, as described above.

Each process performed by the processing apparatus 1 shown in Table 2 is causes, in all of the steps 1 through 5 as described above, a transition from state (rL, P), which is a variable element, to state (rL, P) where the result of the processing in each step is returned to the field. On the other hand, in the conventional program shown in Table 1, the step 1 causes a transition from state (rL, P), a variable element, to a pseudo-intermediate state (pL, P), a fixed element. In addition, the steps 2-4 cause a transition from the pseudo-intermediate state (pL, P), which is a fixed element, to the pseudo-intermediate state (pL, P), which is a fixed element. Then, in step 5, the transition from the pseudo-intermediate state (pL, P), which is a fixed element, to the state (rL, P), which is a variable element, and the result is returned to the field. Thus, in the conventional program, it can be said that the intermediate stages of a series of processes (the steps 1-5) are completed in the program. Therefore, it is considered necessary to replace the entire program when changing a part of the intermediate process.

In the conventional programs shown in Table 1, the order in which the processing is performed is usually specified. For example, in the example shown in Table 1, it is stipulated that steps 1 through 5 be performed in sequence in the program. From this point of view, the program can be said to be a fixed element. On the other hand, steps 1 through 5 in the processing apparatus 1 shown in Table 2 are described as "steps" corresponding to Table 1 for convenience, but there is no particular element that defines the order of processing. In addition, each step can be performed randomly upon the receptor 40's acceptance of the state (rL, P) to be input. Thus, it can be said that the processing performed by the processing apparatus 1 corresponds to a variable element in terms of the order of processing in each step when the desired processing is performed by the processing apparatus 1.

[Differences Between Control Using a Conventional Program and Control by a Processing Apparatus when Changing Control]

Next, the case in which the procedure for controlling the air conditioner based on the temperature and humidity shown in Tables 1 and 2 is changed is explained. In this section, we will explain the case in which the control of the air conditioner is changed to one that takes the outside temperature into account in addition to the temperature and humidity.

First, Table 3 shows the conventional program for the addition of control that takes the outdoor temperature into account to the conventional program shown in Table 1.

TABLE 3

| step | Set of the state (Label, Profile) before input | Operation of algorithm or logic | Set of the state (Label, Profile) after operation |
|---|---|---|---|
| 1 | (rL: temperature, P: *° C.) in the field | Generate a profile (hot, good, cold) from difference between the temperature and the set temperature | (pL: pseudo-intermediate state (temperature gap), P: (hot, good, cold)) in the program |

TABLE 3-continued

| step | Set of the state (Label, Profile) before input | Operation of algorithm or logic | Set of the state (Label, Profile) after operation |
|---|---|---|---|
| 2 | (rL: humidity, P: *%) in the field | Generate a profile (steamy, good, dry) from difference between the humidity and the set humidity | (pL: pseudo-intermediate state (humidity gap), P: (steamy, good, dry)) in the program |
| 3 | (rL: outdoor temperature, P: *° C.) in the field | Generate a profile (*° C.) of the outdoor temperature | (pL: pseudo-intermediate state (outdoor temperature), P: *° C.) in the program |
| 4 | (pL: pseudo-intermediate state (temperature gap), P: (hot, good, cold)) in the program | Generate a profile (Pw watt) based on the pseudo-intermediate states (temperature gap), (humidity gap), (outdoor temperature), and the motor control map | (pL: pseudo-intermediate state (motor power), P: (Pw watt)) in the program |
| 5 | (pL: pseudo-intermediate state (humidity gap), P: (steamy, good, dry)) in the program | Generate a profile (Pw watt) based on the pseudo-intermediate states (temperature gap), (humidity gap), (outdoor temperature), and the motor control map | (pL: pseudo-intermediate state (motor power), P: (Pw watt)) in the program |
| 6 | (pL: pseudo-intermediate state (outdoor temperature), P: *° C.) in the program | Generate a profile (Pw watt) based on the pseudo-intermediate states (temperature gap), (humidity gap), (outdoor temperature), and the motor control map | (pL: pseudo-intermediate state (motor power), P: (Pw watt)) in the program |
| 7 | (pL: pseudo-intermediate state (motor power), P: (Pw watt)) in the program | Provide power (Pw watt) to the motor | (rL: temperature, P: T° C.) and (rL: humidity, P: H %) in the field |

In Table 3, compared to Table 1, the steps 3 and 6 are added, and in steps 4 and 5, the pseudo-intermediate state (in this case, the outdoor air temperature) is to be taken into account in the operation. Next, Table 4 shows the change program for changing the operation from the control shown in Table 1 to the control shown in Table 3. Note that an outdoor temperature sensor may be added to detect the outdoor temperature, but this is not a change related to the program, so the explanation is omitted.

TABLE 4

| step | Set of the state (Label, Profile) before input | Operation of algorithm or logic | Set of the state (Label, Profile) after operation |
|---|---|---|---|
| 1 | (rL: existence of external storage (e.g., SD card, etc), P: (yes, no)) in the field | Check the file in the external storage, then generate a profile (OK, NG) | (pL: pseudo-intermediate state (update), P: (OK, NG)) in the program |
| 2 | (pL: pseudo-intermediate state (update), P: (OK, NG)) in the program | If OK, then stop the control program in operation. | (pL: pseudo-intermediate state (control program), P: stop) in the program |
| 3 | (pL: pseudo-intermediate state (control program), P: stop) in the program | Stop the control program | (rL: status of the control program operation, P: stop) in the field |
| 4 | (pL: pseudo-intermediate state (control program), P: stop) in the program | Stop the motor | (rL: status of the motor, P: stop) in the field |
| 5 | (pL: pseudo-intermediate state (control program), P: stop) in the program | Stop the sensor | (rL: status of the sensor, P: stop) in the field |
| 6 | (rL: status of the control program operation, P: stop) in the field | Check the status (run or stop) of the control program | (pL: pseudo-intermediate state (status of the control program operation), P: stop) in the program |
| 7 | (pL: pseudo-intermediate state (status of the control program operation), P: stop) in the program | Delete the old control program (e.g., control V1) in the program storage area or media of the air conditioner | (rL: existence of the control program, P: NO) in the field |
| 8 | (rL: existence of the control program, P: NO) in the field | Check the existence of the control program | (pL: pseudo-intermediate state (existence of the control program), P: no) in the program |

TABLE 4-continued

| step | Set of the state (Label, Profile) before input | Operation of algorithm or logic | Set of the state (Label, Profile) after operation |
|---|---|---|---|
| 9 | (pL: pseudo-intermediate state (existence of the control program), P: no) in the program | Copy the new control program into the program storage area or media of the air conditioner from external storage | (rL: update of the control program, P: Done) in the field |
| 10 | (rL: update of the control program, P: Done) in the field | Activate the new control program | (pL: pseudo-intermediate state (update of the control program), P: activate) in the program |
| 11 | (pL: pseudo-intermediate state (update of the control program), P: activate) in the program | Activate the motor | (rL: motor status, P: operating) in the field |
| 12 | (pL: pseudo-intermediate state (update of the control program), P: activate) in the program | Activate the sensor | (rL: sensor status, P: operating) in the field |
| 13 | (pL: pseudo-intermediate state (update of the control program), P: activate) in the program | Activate the sensor of the outdoor air temperature | (rL: outdoor air temperature sensor status, P: operating) in the field |
| 14 | | | (rL: air conditioner status, P: updated) in the field |

In the example shown in Table 4, the program and sensor before modification are stopped in the steps 1-6, and the program before modification is deleted in the steps 7 and 8. Also, after loading and activating the new program in the steps 9 and 10, in the steps 11 to 13 each sensor is activated and the process is completed in the step 14. At this time, it is expected that the program for modification shown in Table 4 will also handle the pseudo-intermediate state that exists in the program area in the steps 1-13. As mentioned above, the pseudo-intermediate state is a fixed element, and it is considered that program operation must be stopped in order to change it. Therefore, it can be said that the program for modification that handles the pseudo-intermediate state is also a fixed element.

Next, we will explain the changes to the processing contents in the processing apparatus 1. First, Table 5 shows the processing procedures in the processing apparatus 1 when the control of outside temperature is added to the processing in the processing apparatus 1 shown in Table 2.

TABLE 5

| step | Set of the state (Label, Profile) received at Receptor | Operation of Determiner | Operation in Actor | Set of the state (Label, Profile) affected by Actor |
|---|---|---|---|---|
| 1 | (rL: temperature, P: *° C.) in the field | Compare with the set temperature, then activate an actor | Generate a Profile (hot, good, cold) from difference between the temperature and the set temperature | (rL: intermediate state (temperature gap), P: (hot, good, cold)) in the field |
| 2 | (rL: humidity, P: *%) in the field | Compare with the set humidity, then activate an actor | Generate a profile (steamy, good, dry) from difference between the humidity and the set humidity | (rL: intermediate state (humidity gap), P: (steamy, good, dry)) in the field |
| 3 | (rL: outdoor air temperature, P: *° C.) in the field | Compare with the any state of outdoor temperature that is possible (e.g., '*'), then activate an actor (unconditionally) | Generate a profile of outdoor temperature (*° C.) | (rL: intermediate state (outdoor temperature), P: *° C.) in the field |
| 4 | (rL: intermediate state (temperature gap), P: (hot, good, cold)) in the field | Compare with the desired state, then activate an actor if the state is not the desired state | Generate a profile (Pw watt) based on the intermediate states (temperature gap), (humidity gap), (outdoor temperature), and the motor control map | (rL: intermediate state (motor power), P: (Pw watt)) in the field |

TABLE 5-continued

| step | Set of the state (Label, Profile) received at Receptor | Operation of Determiner | Operation in Actor | Set of the state (Label, Profile) affected by Actor |
|---|---|---|---|---|
| 5 | (rL: intermediate state (humidity gap), P: (steamy, good, dry)) in the field | Compare with the desired state, then activate an Actor if the state is not the desired state | Generate a profile (Pw watt) based on the intermediate states (temperature gap), (humidity gap), (outdoor temperature), and the motor control map | (rL: intermediate state (motor power), P: (Pw watt)) in the field |
| 6 | (rL: intermediate state (outdoor temperature), P: *° C.) in the field | Compare with the any state of outdoor temperature that is possible (e.g., '*'), then activate an actor (unconditionally) | Generate a profile (Pw watt) based on the intermediate states (temperature gap), (humidity gap), (outdoor temperature), and the motor control map | (rL: intermediate state (motor power), P: (Pw watt)) in the field |
| 7 | (rL: intermediate state (motor power), P: (Pw watt)) in the field | Compare with the any state of motor power that is possible (e.g., '*'), then activate an actor (unconditionally) | Provide power (Pw watt) to the motor | (rL: temperature, P: T° C.) and (rL: humidity, P: H %) in the field |

In Table 5, compared to Table 2, the steps 3 and 6 are added, and in the steps 4 and 5, the intermediate state (in this case, outdoor air temperature) to be taken into account in the operation. Next, Table 6 shows the processing procedure at the processing apparatus 1 for changing the operation from the control shown in Table 2 to the control shown in Table 5. Note that an outdoor temperature sensor may be added to detect the outdoor temperature, but this is not a change related to the program, so the explanation is omitted. In Table 6, for comparison with the case of the conventional program, the processing in the processing apparatus 1 is shown where each step corresponds to a step in the conventional program (Table 4). In Table 6, cells other than steps are marked with "-", indicating that the processing corresponding to each step in the conventional program is not performed in the processing apparatus 1.

TABLE 6

| step | Set of the state (Label, Profile) received at Receptor | Operation of Determiner | Operation in Actor | Set of the state (Label, Profile) affected by Actor |
|---|---|---|---|---|
| 1 | (rL: existence of external storage (e.g., SD card, etc), P: (yes, no)) in the field | Activate an actor if the external storage exists | Check the file in the external storage, then generate a profile (OK, NG) | (rL: intermediate state (update), P: (OK, NG)) in the field |
| 2 | — | — | — | — |
| 3 | — | — | — | — |
| 4 | — | — | — | — |
| 5 | — | — | — | — |
| 6 | — | — | — | — |
| 7 | — | — | — | — |
| 8 | — | — | — | — |
| 9 | (rL: intermediate state (update), P: (OK, NG)) in the field | Activate an actor if OK | State transition method information, State identification information, and actors related to function changes are copied from an external storage medium to the program storage area or medium of the main unit of the air conditioner. Or, the state transition method information, state identification information, and actors of the processing | (rL: update of the control program, P: Done) in the field |

TABLE 6-continued

| step | Set of the state (Label, Profile) received at Receptor | Operation of Determiner | Operation in Actor | Set of the state (Label, Profile) affected by Actor |
|---|---|---|---|---|
| | | | apparatus prior to the change are edited only for the portions that have been changed, such as the addition or deletion of functions. | |
| 10 | — | — | — | — |
| 11 | — | — | — | — |
| 12 | — | — | — | — |
| 13 | (rL: update of the control program, P: Done) in the field | Activate an actor if OK | Activate the outdoor air temperature sensor | (rL: outdoor air temperature sensor status, P: operating) in the field |
| 14 | | | | (rL: air conditioner status, P: updated) in the field |

As shown in Table 6, in the processing apparatus 1, the steps 2-8 and the steps 10-12 in the conventional program are no longer necessary when changing the control contents. In addition, the steps 1 and 9 are made externally observable by setting the intermediate state in a field, and the processing content has also been changed.

The steps 2-8 were processes related to stopping the operation of the program before the change and deleting the program. Even though the conventional program is reconfigurable, the program itself is a fixed element, so it is considered necessary to stop the operation of the program in order to change it. In contrast, in the processing apparatus 1, the state transition method information D1, the state identification information D2, and the actors 50 exist on the field and can be configured to be separated from the determiner 30, which is a fixed element. Therefore, it is possible to change the state transition method information D1, the state identification information D2 and the actor 50 while continuing a state in which the determiner 30 is operating based on the program before the change.

In addition, steps 10-12 were processes related to starting the program after the change. Since the conventional program is changed once the program operation is stopped as described above, it can be said that the operation to start the program after the change is necessary. On the other hand, in step 9, the processing apparatus 1 can be placed in a state to be updated only by preparing the state transition method information D1, the state identification information D2, and the actor 50 specified by the state transition method information D1, which are required as a result of a change in the operation content. Therefore, for example, by setting new state transition method information D1 and state identification information D2 (and the actor 50), the necessary receptors 40 is prepared and ready to start processing after the change. In addition, since the determiner 30 itself, which makes judgments based on the field state acquired in the receptor 40, is not stopped as described above, the process can easily be transferred to the process after the change. Since the sensor for the outdoor temperature itself needs to be driven anew, it is considered necessary to provide the step 13 in the same manner as in the conventional program.

Thus, comparing the conventional program with the processing apparatus described in this embodiment, the procedure for changing the processing content, especially depending on the size of the area that is considered a fixed element, is very different.

In conventional programs, the part of the program to be changed (e.g., the processing based on the information acquired by the outside temperature sensor) is considered to be fixed inside the program. For example, the content of the processing to be performed based on the information on the outside temperature after acquiring the information on the outside temperature is described in the program. Therefore, in conventional programs, in order to dynamically change a function, it is conceivable to assume such a change in advance, describe the program related to the function in question, and change the control contents at the timing of the change. However, if this change cannot be assumed in advance, it cannot be described in the program beforehand. Therefore, it is considered necessary to stop the program once it has been prepared in order to add some function. In conventional programs, dynamic loading and unloading of software modules is built in as a function, however, the program still needs to be replaced when trying to use an API (Application Programming Interface), etc. that is not provided in the main program.

In contrast, in the processing apparatus described in this embodiment, since the state transition method information D1, the state identification information D2, and Actor 50, that can be said to be the main part of the conventional program, exist on the field, so changes can be made regardless stopping the operation of the determiners 30, which are fixed elements. The modification of the processing apparatus 1 (rewriting of the state transition method information D1 and the state identification information D2) described in this embodiment means that the processing apparatus 1 does not refer to the enabling of functions previously incorporated in the processing apparatus 1, but is intended to add new functions after the operation of the processing apparatus 1 has been started.

<Action>

As described above, the processing apparatus 1 includes a determiner 30 that compares state information, which is information pertaining to states obtained from field, and performs processing related to the determiner 30 based on information specifying the contents of the comparison in the determiner 30 and actions related to state transitions according to the results of the comparison, and information related to the generation of the state information generator for generating the state Information from the information related to the state of the field. The information that specifies the contents of the comparison in the determiner 30 and the operation pertaining to the state transition according to the result of the comparison, and the information pertaining to the generation of the state information generator for generating the state information from the information pertaining to the state of the field can be changed regardless of the operation of the determiner 30. The above information specifying the contents of the comparison in the determiner 30 and the operation pertaining to the state transition according to the result of the comparison, and the information pertaining to the generation of the state information generator to generate the state information from the information pertaining to the state of the field, are included in the state transition method information D1 and the state identification information D2 in the above embodiment. In the above embodiment, processing related to the determiners 30 is performed based on the state transition method information D1 and the state identification information D2. The state transition method information D1 and the state identification information D2 can be changed regardless the operation of the determiner 30.

In addition, the processing method pertaining to an embodiment of the present disclosure performs a comparison of state information, which is information pertaining to state obtained from the field, by the determiner 30, and performs processing related to the determiner 30 based on information specifying the contents of the comparison in the determiner 30 and actions related to state transitions according to the results of the comparison, and information related to the generation of the state information generator for generating the state Information from the information related to the state of the field. The information that specifies the contents of the comparison in the determiner 30 and the operation pertaining to the state transition according to the result of the comparison, and the information pertaining to the generation of the state information generator for generating the state information from the information pertaining to the state of the field can be changed regardless of the operation of the determiner 30.

The processing program pertaining to an embodiment of the present disclosure is a processing program for causing a computer to function as a processing apparatus, and to realize a judgment function for comparing state information, which is information pertaining to state obtained from the field, and to perform processing related to the judgment function based on information specifying the contents of the comparison in the judgment function and actions related to state transitions according to the results of the comparison, and information related to the generation of the state information generator for generating the state information from the information related to the state of the field. The information that specifies the contents of the comparison in the judgment function and the operation pertaining to the state transition according to the result of the comparison, and the information pertaining to the generation of the state information generator for generating the state information from the information pertaining to the state of the field can be changed regardless of the operation of the judgment function.

According to the above processing apparatus 1, processing method, and processing program, the information specifying the contents of the comparison in the determiner 30 and the operation pertaining to the state transition according to the result of the comparison, and the information pertaining to the generation of the state information generator to generate the state information from the information pertaining to the field states, can be changed regardless of the operation of the determiner 30. In the above embodiment, the state transition method information D1 and the state identification information D2, which include these information, can be changed regardless of the operation of the determiner 30. Therefore, compared to conventional programs, the above information included in the state transition method information D1 and the state identification information D2 can be changed regardless stopping the operation of the determiner 30, even when conditions are changed or functions are added, thus increasing convenience. Furthermore, according to the above processing apparatus 1, processing method, and processing program, not only convenience but also reliability or safety can be enhanced. This point is described above.

The determiner 30 can include a receptor's platform 33 as a state information acquisition unit for acquiring the state information, and an actor's platform 34 as the state transition instruction unit that directs the state transition according to the comparison result. By configuring the determiner 30 to include a state information acquisition unit for acquiring the state information and a state transition instruction unit for instructing state transitions according to the comparison results, the state transition method information D1 and state identification information D2 are changed, the processing can be changed flexibly even if the operation contents in the determiners 30 or the processing based on the comparison results are changed.

The information that specifies the contents of the comparison in the determiner 30 and the action pertaining to the state transition according to the result of the comparison, and the information related to the generation of the state information generator for generating the state information from the information pertaining to the state of the field (in the above embodiment, the state transition method information D1 and the state identification information D2 are shown as information including these information) are variable elements that exist in the field, while the determiner can be a fixed element that is detached from the field. In this way, the information that specifies the contents of the comparison in the determiner 30 and the action pertaining to the state transition according to the result of the comparison, and the information related to the generation of the state information generator to generate the state information from the information related to the field state are configured as variable elements, and the determiner is configured as a fixed element, it is possible to flexibly change the content of processing in the processing apparatus without stopping all processing in the processing apparatus, even when the content of processing in the processing apparatus is changed.

The processing apparatus 1 of another embodiment of the present disclosure also includes a determiner 30 that performs a comparison of the state information, which is information pertaining to a state obtained from a field, and the state Information includes a label pertaining to the property of the state and a profile that indicates what state the property identified by the label is in.

According to the above processing apparatus, the state information to be compared in the determiner 30 includes a label pertaining to the property of the status and a profile indicating the status of the property identified by the label. This configuration prevents the mistaking of target information when making comparisons in the determiner 30 and enables appropriate comparisons to be made. Therefore, even if the operation of the comparator or the processing based on the comparison result is changed, the processing can be changed flexibly, and convenience, reliability, or safety can be enhanced.

Here, the information that specifies the contents of the comparison in the determiner 30 and the action pertaining to the state transition according to the result of the comparison, and the information related to the generation of the state information generator for generating the state information from the information pertaining to the state of the field (in the above embodiment, the state transition method information D1 and the state identification information D2 are shown as information including the above information) can be used as the basis for processing related to the determiner. Since the processing related to judgment by the determiners 30 is specified based on these information, compared to conventional programs, changes can be made without changing the determiners themselves when conditions are changed or functions are added, and the convenience as a device, reliability, or safety, etc. can be improved.

Also, the processing apparatus 1 pertaining to another form of the present disclosure includes a determiner 30 that compares the state information, which is information pertaining to states obtained from a field, and performs processing related to the determiner 30 based on information specifying the contents of the comparison in the determiner 30 and the operation pertaining to the state transition according to the result of the comparison, and information pertaining to the generation of the state information generator for generating the state information from information pertaining to the state of the field (in the above embodiment, information including these information is referred to as the state transition method information D1 and the state identification information D2 are shown). In addition, the state transition method information D1 and the state identification information D2 can be changed regardless of the operation of the determiners 30, and the state information can be in a form that includes a label pertaining to a property and a profile indicating what state the property identified by the label is in.

According to the above processing apparatus 1, information specifying the contents of the comparison in the determiner 30 and the operation pertaining to the state transition according to the result of the comparison and information pertaining to the generation of the state information generator for generating state Information from information pertaining to the state of the field can be changed regardless the operation of the determiner 30. Therefore, compared to conventional programs, the above information can be changed regardless stopping the operation of the determiner, even when conditions are changed or functions are added, thereby increasing convenience, reliability, or safety, etc. In addition, since the state information includes a label pertaining to the property of the condition and a profile indicating the state of the property identified by the label, it is possible to prevent mistaken comparisons of target information when making comparisons in the determiner 30 and to perform appropriate comparisons. Therefore, even if the operation contents or the processing based on the comparison results in the determiner 30 are changed, the processing can be changed flexibly, and convenience, reliability, or safety, etc. can be enhanced.

<Others>

Although this embodiment has been described in detail above, it is obvious to those skilled in the art that this embodiment is not limited to the embodiments described herein.

It goes without saying that the application example, etc. of the processing apparatus 1 described in the above embodiment is only an example, and various changes can be made. When the processing apparatus 1 functions as a control device that controls a desired device, the contents of the judgment made by the determiner 30, for example, the contents specified by the state transition method information D1 and the state identification information D2, for example, may be changed as appropriate.

APPENDIX

This disclosure may also include the following configurations

A processing method in which a comparison is performed by the determiner on state Information, which is information pertaining to a state obtained from a field, and the state information includes a label pertaining to the property of the state and a profile indicating what state the property identified by the label is in.

A processing program for causing a computer to function as a processing apparatus, and to realize a judgment function for comparing state information, which is information pertaining to a state obtained from a field, the state information including a label pertaining to a property of the state and a profile indicating what state the property identified by the label is in.

A processing method including: comparing state information, which is information pertaining to states obtained from a field, by a determiner; and processing related to the determiner based on the information specifying the contents of the comparison in the determiner and actions pertaining to state transitions according to the results of the comparison, and the information pertaining to generation of a state information generator to generate state Information from information pertaining to states in a field. The information specifying the contents of the comparison in the determiner and the operation pertaining to the state transition according to the result of the comparison and information pertaining to the generation of the state information generator for generating state information from information pertaining to the state of the field can be changed regardless the operation of the determiner, and the state information includes a label pertaining to a property of the state and a Profile indicating what state the property identified by the label is in.

A processing program for causing a computer to function as a processing apparatus id described follows. To realize a judgment function for comparing state information, which is information pertaining to a state obtained from a field, processing related to the judgment function based on the information specifying the contents of the comparison in the judgment function and actions pertaining to state transitions according to the results of the comparison, and the information pertaining to generation of a state information generator to generate state information from information pertaining to states in a field. The information specifying the contents of the comparison in the judgment function and the operation for state transition according to the comparison result, and the information for generating the state information from the information pertaining to the field state, can be changed regardless of the operation of the judgment function. And the state information includes a label pertaining to the property of the state and a profile indicating what state the property identified by the label is in.

REFERENCE SIGNS LIST

1, 1A, 1B, 1C, 1D, 11E, 1F, 1G, 1H, 1X . . . Processing apparatus 10, 10A, 10B, 10F, 10G, 10H . . . State transition method acquisition unit, 20, 20A, 20B, 20C, 20D, 20E, 20F, 20G, 20H . . . State identification acquisition unit, 30, 30A,

49

30B, 30C, 30D, 30E, 30F, 30G, 30H . . . Determiner, 31 . . . Core, 32 . . . Parser, 33 . . . Receptor's platform, 34 . . . Actor's platform, 40, 40A, 40B, 41, 42, 43, 44, 45, 46 . . . Receptors, 50, 50A, 50B, 50C, 50D, 51, 52 . . . Actors.

The invention claimed is:

1. A processing apparatus comprising:
a receptor that generates state information based on a state of a field and indicating the state of the field;
a determiner that compares the state information based on operation identification information to identify an operation of the determiner; and
an actor that executes an operation relating to a transition in the state of the field based on a determination result by the determiner,
wherein the receptor, the operation identification information and the actor can be modified independently regardless of how each is set,
wherein the determiner is a fixed element configured to operate continuously and be separated from the field, and
wherein the receptor, the operation identification information and the actor are variable elements existing in the field, and wherein the variable elements can be modified without stopping the operation of the determiner.

2. The processing apparatus according to claim 1, wherein the operation relating to the generation of the state information in the receptor is identified by the operation identification information.

3. The processing apparatus according to claim 1, wherein the operation relating to the transition in the state of the field to be executed in the actor is identified by the operation identification information.

4. The processing apparatus according to claim 1, wherein the state information includes a label relating to properties of the state of the field and a profile indicating what kind of state the properties specified by the label are.

5. The processing apparatus according to claim 4, wherein the determiner that compares whether the label and the profile included in the state information are the state identified in the operation identification information.

6. The processing apparatus according to claim 1, wherein the operation identification information includes state transition method information identifying a compare details and identifying an operation relating to state transition in accordance with a result of the compared details and state identification information identifying a predetermined state of state transition.

7. The processing apparatus according to claim 1, wherein the operation identification information includes information describing an association between the state information and the actor, information describing identification of the actor and operation method thereof and information describing identification of information necessary for generating the receptor corresponding to the state information.

8. The processing apparatus according to claim 1, wherein the determiner further includes a state information acquisition unit that acquires the state information from the receptor.

9. The processing apparatus according to claim 8, wherein the state information acquisition unit can generate, modify or delete the receptor based on the operation identification information.

10. The processing apparatus according to claim 1, wherein the determiner further includes a state transition instruction unit that instructs state transition in accordance with the determination result.

11. The processing apparatus according to claim 10, wherein the state transition instruction unit can commence, modify or terminate control with respect to the actor based on the operation identification information.

12. The processing apparatus according to claim 1, wherein the determiner includes a parser that performs preprocessing for handling the operation identification information.

13. A processing method comprising:
generating state information, by means of a receptor, based on a state of a field and indicating the state of the field;
comparing, by means of a determiner, the state information based on operation identification information to identify an operation of the determiner; and
executing, by means of an actor, an operation relating to a transition in the state of the field based on a determination result by the determiner,
wherein the receptor, the operation identification information and the actor can be modified independently regardless of how each is set,
wherein the determiner is a fixed element configured to operate continuously and be separated from the field, and
wherein the receptor, the operation identification information and the actor are variable elements existing in the field, and wherein the variable elements can be modified without stopping the operation of the determiner.

14. The processing apparatus according to claim 1, wherein the determiner includes:
a core configured to compare the state information received from the receptor with a combination of the actor and a state identified by the operation identification information;
a parser configured to perform preprocessing for handling the operation identification information in the core;
a receptor's platform configured to obtain the state information from the receptor and pass the state information to the core, and to control generation, modification, or deletion of the receptor based on the operation identification information; and
an actor's platform configured to control the actor based on the operation identification information by activating the actor based on a determination result by the core.

15. The processing apparatus according to claim 1, wherein the receptor is configured to be linked to a target to acquire the state of the field, and to provide information acquired from the target to the determiner as the state information.

16. The processing apparatus according to claim 1, wherein the receptor is configured to detect a change in a target existing in the field,
wherein detection of the change in the target includes at least one selected from the group consisting of:
detecting a change in a value included in a file;
detecting an insertion of a value into a device having First-In-First-Out characteristics;
detecting an incoming packet at a specific port;
detecting a change in a characteristic of a specific device; and
detecting a change in a specific record in a database.

17. The processing apparatus according to claim 1, wherein the actor comprises an acting entity existing in the field, and is configured to transition the state of the field by operating the acting entity based on the determination result.

18. The processing apparatus according to claim 1, wherein the actor is configured to execute an operation on a target existing in the field, wherein the operation on the target includes at least one selected from the group consisting of:

changing a value included in a file;

inserting a value into a device having First-In-First-Out characteristics;

sending a packet to a specific node or port;

sending a feature value to a specific device;

modifying a specific record in a database;

executing a specified instruction; and executing a specified command in a shell.

\* \* \* \* \*